US008682343B2

(12) United States Patent
Schmidt et al.

(10) Patent No.: US 8,682,343 B2
(45) Date of Patent: Mar. 25, 2014

(54) MOBILE RADIO COMMUNICATION DEVICES AND METHODS FOR CONTROLLING MOBILE RADIO COMMUNICATION DEVICES

(75) Inventors: Andreas Schmidt, Braunschweig (DE); Markus Dominik Mueck, Unterhaching (DE); Achim Luft, Braunschweig (DE)

(73) Assignee: Intel Mobile Communications GmbH, Neubiberg (DE)

( * ) Notice: Subject to any disclaimer, the term of this patent is extended or adjusted under 35 U.S.C. 154(b) by 491 days.

(21) Appl. No.: 12/486,896

(22) Filed: Jun. 18, 2009

(65) Prior Publication Data

US 2010/0323714 A1 Dec. 23, 2010

(51) Int. Cl.
*H04W 24/00* (2009.01)
(52) U.S. Cl.
USPC ................. 455/456.1; 455/550.1
(58) Field of Classification Search
USPC .......... 455/421, 456.1, 436–438, 166.2, 212, 455/228, 406, 440, 445, 425, 450, 11.1, 455/456.3, 466, 502, 518, 562.1; 709/220, 709/201, 219, 223, 227, 229, 232, 238, 709/240; 370/312, 216, 254, 338, 313, 328, 370/329, 331, 349, 352, 392, 437, 442, 335, 370/401, 389; 375/211, 260, 294, 295, 261, 375/347
See application file for complete search history.

(56) References Cited

U.S. PATENT DOCUMENTS 7,046,962 B1 * 5/2006 Belcea ....................... 455/67.11
2006/0046765 A1 3/2006 Kogure 2007/0087756 A1 * 4/2007 Hoffberg ..................... 455/450
2007/0249316 A1 10/2007 Rao
2008/0225769 A1 * 9/2008 Noisette et al. ............. 370/312

(Continued)

FOREIGN PATENT DOCUMENTS

| EP | 1 633 059 A2 | 3/2006 | |
|----|----|----|----|
| JP | 2004015567 | * 1/2004 | ......................... 7/38 |
| KR | 1020090055040 A | 6/2009 | |
| WO | 2008050425 A1 | 5/2008 | |

OTHER PUBLICATIONS

3 GPP TS 36.300: "E-UTRA and E-UTRAN Overall Description"; Stage 2, v8.6.0 (Release 8).

(Continued)

*Primary Examiner* — Edward Urban
*Assistant Examiner* — Golam Sorowar

(57) ABSTRACT

In an embodiment, a mobile radio communication device is provided. The mobile radio communication device may include a mobile radio communication protocol circuit configured to provide a mobile radio base station function for a mobile radio communication with another mobile radio communication device; a network control interface circuit configured to receive time dependent or location dependent operation control signals from a network device containing data that enables determination of at least one of at least one piece of location-related information and at least one piece of time-related information; a localization circuit configured to determine at least one of at least one piece of time-related information and at least one piece of location-related information of the mobile radio communication device based on the operation control signals received by the network control interface circuit; and an execution circuit configured to execute a pre-defined action to control the mobile radio communication protocol circuit based on the at least one piece of time-related information or the at least one piece of location-related information determined by the localization circuit.

21 Claims, 10 Drawing Sheets

(56) References Cited

U.S. PATENT DOCUMENTS

| | | |
|---|---|---|
| 2008/0267114 A1 | 10/2008 | Mukherjee et al. |
| 2009/0209199 A1 | 8/2009 | Suga |
| 2010/0005158 A1* | 1/2010 | Savolainen .................. 709/220 |

OTHER PUBLICATIONS

3 GPP TS 36.331: "E-UTRA Radio Resource Control (RRC) Protocol", v8.3.0 (Release 8).

IEEE 802.16 Broadband Wireless Access Working Group RSSI/QoS-based Mobility Management Weihuang et al. Aug. 8, 2008; pp. 1-5 http://www.ieee802.org/16/tgm/contrib; filename: C80216m-08_680r3.doc.

Sundaresan, K; Rangarajan, S.: Efficient Resource Management in OFDMA Femto Cells. In: Proceedings of the 10th ACM international symposium on mobile ad hoc networking and computing, MobilHoc'09, May 18-21, 2009, New Orleans, pp. 33-42—ISBN: 978-1-60558-624.3.

English language abstract of KR 1020090055040 A dated Jun. 1, 2009.

* cited by examiner

US 8,682,343 B2

MOBILE RADIO COMMUNICATION DEVICES AND METHODS FOR CONTROLLING MOBILE RADIO COMMUNICATION DEVICES

TECHNICAL FIELD

Embodiments relate generally to mobile radio communication devices and methods for controlling mobile radio communication devices.

BACKGROUND

A 'NodeB' may be understood as a base station designed for Universal Mobile Telecommunication System (UMTS) that is controlled by a Radio Network Controller (RNC). A NodeB is usually capable of taking care of up to six UMTS radio cells. All NodeBs and all RNCs together usually form the so-called UMTS Terrestrial Radio Access Network (UTRAN) of a Mobile Network Operator (MNO).

In 3GPP ($3^{rd}$ Generation Partnership Project), concepts are developed for supporting the deployment of so-called 'Home NodeBs' or 'Home eNodeBs' for the following Radio Access Technologies, for example:
- 3G UMTS (UMTS based on Code Division Multiple Access (CDMA), also referred to as 'UTRA' in 3GPP terminology);
- and its successor technology
- 3.9G LTE (Long Term Evolution, also referred to as 'E-UTRA' in 3GPP terminology).

A 'Home NodeB' (HNB) or 'Home eNodeB' (HeNB) may be understood in accordance with 3GPP as a trimmed-down version of a base station optimized for use in residential or corporate environments (e.g., private homes, public restaurants or small office areas).

So-called 'Home Base Stations' or 'Femto-Cells' are designed to be installed by the customer himself within his premises e.g., in a 'plug-and-play' manner. As the 'Femto Cell' box may be physically solely under the control of the customer, it can be moved around and even carried to locations different from the customer's house.

For the Mobile Network Operator (MNO) this nomadic use case can be of certain disadvantages, because some kind of reliable 'proof of location' may be desired in some countries. If this cannot be guaranteed, regulatory requirements may not be met (due to H(e)NBs causing heavy interferences), or emergency calls may not be traced back to where they were initiated.

BRIEF DESCRIPTION OF THE DRAWINGS

In the drawings, like reference characters generally refer to the same parts throughout the different views. The drawings are not necessarily to scale, emphasis instead generally being placed upon illustrating the principles of various embodiments. In the following description, various embodiments are described with reference to the following drawings, in which.

DESCRIPTION

Figure 1:
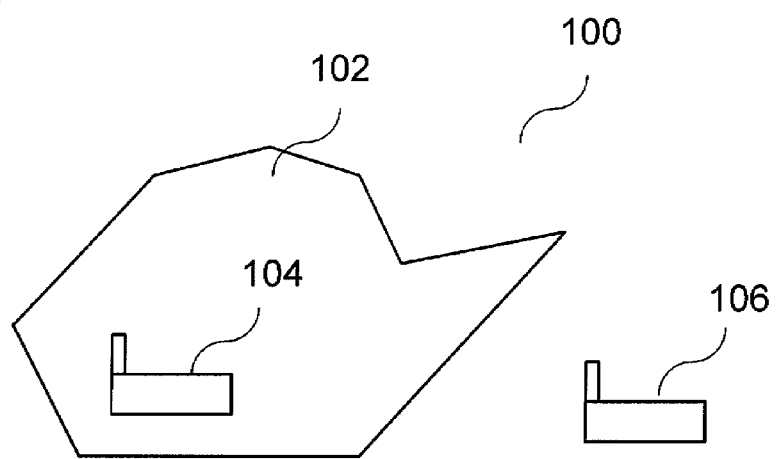
FIG. 1 shows a mobile radio communication system in accordance with an embodiment.

The following detailed description refers to the accompanying drawings that show, by way of illustration, specific details and embodiments in which the invention may be practiced. These embodiments are described in sufficient detail to enable those skilled in the art to practice the invention. Other embodiments may be utilized and structural, logical, and electrical changes may be made without departing from the scope of the invention. The various embodiments are not necessarily mutually exclusive, as some embodiments can be combined with one or more other embodiments to form new embodiments.

The mobile radio communication devices according to various embodiments may include a memory which is for example used in the processing carried out by the mobile radio devices. A memory used in the embodiments may be a volatile memory, for example a DRAM (Dynamic Random Access Memory) or a non-volatile memory, for example a PROM (Programmable Read Only Memory), an EPROM (Erasable PROM), EEPROM (Electrically Erasable PROM), or a flash memory, e.g., a floating gate memory, a charge trapping memory, an MRAM (Magnetoresistive Random Access Memory) or a PCRAM (Phase Change Random Access Memory).

In an embodiment, a "circuit" may be understood as any kind of a logic implementing entity, which may be special purpose circuitry or a processor executing software stored in a memory, firmware, or any combination thereof. Thus, in an embodiment, a "circuit" may be a hard-wired logic circuit or a programmable logic circuit such as a programmable processor, e.g. a microprocessor (e.g. a Complex Instruction Set Computer (CISC) processor or a Reduced Instruction Set Computer (RISC) processor). A "circuit" may also be a processor executing software, e.g. any kind of computer program, e.g. a computer program using a virtual machine code such as e.g. Java. Any other kind of implementation of the respective functions which will be described in more detail below may also be understood as a "circuit" in accordance with an alternative embodiment.

The terms "coupling" or "connection" are intended to include a direct "coupling" (for example via a physical link) or direct "connection" as well as an indirect "coupling" or indirect "connection" (for example via a logical link), respectively.

The term "protocol" is intended to include any piece of software that is provided to implement part of any layer of the communication definition. "Protocol" may include the functionality of one or more of the following layers: physical layer (layer 1), data link layer (layer 2), network layer (layer 3), or any other sub-layer of the mentioned layers or any upper layer.

In various examples throughout this description, the terms 'Home Base Station', 'Home NodeB' (e.g. for UMTS), 'Home eNodeB' (e.g. for LTE), 'Femto Cell' and 'mobile radio communication device providing a mobile radio base station function' (or for sake of brevity 'mobile radio communication device' only) are referring to the same logical entity and will be used interchangeably throughout the entire description.

In contrast to the Home Base Stations, macro cells (or legacy NodeBs) denote large scale mobile radio base stations that are operated by a mobile network operator (MNO).

Various embodiments are provided for devices, and various embodiments are provided for methods. It will be understood, that basic properties of the devices also hold for the method and vice versa. Therefore, for sake of brevity, duplicate description of such properties is omitted.

FIG. 1 shows a mobile radio communication system 100 in accordance with an embodiment. A first mobile radio communication device 104 which may provide a first mobile radio base station function may be provided inside an area 102, e.g. a communication-allowed area as will be described in more detail below. The communication allowed area 102 may have any shape, e.g. a polygon shape, a circular shape, an elliptic shape, or any combination thereof. A second mobile radio communication device 106 which may provide a second mobile radio base station function may be provided outside the area 102. The first mobile radio base station function and the second mobile radio base station function may be configured to provide mobile radio base station functions according to the same radio communication technology or according to different radio communication technologies.

Although only one area 102 is specified in FIG. 1, any number of areas may be provided according to various embodiments.

Although only two mobile radio communication devices are shown in FIG. 1, any number of mobile radio communication devices may be present in various embodiments. The number of mobile radio communication devices inside or outside any area is not limited.

In various embodiments, each of the first mobile radio communication devices 104 and the second mobile radio communication device 106 may be desired (or required) to receive and evaluate low bandwidth operation control signals over at least one of its interfaces (for example over the wireless link of the cellular communication system if it resides in the coverage of a mobile radio macro cell or over a TV or radio broadcasting system, or a combination thereof). It should be noted that macro cells may enable a finer granularity than TV or radio broadcasting systems. According to various embodiments, these operation control signals may be time variant and location dependent. They may be embedded into the existing C-Plane (Control Plane) or U-Plane (User Plane) data of the system in question. To decide whether an operation control signal is valid, the Home Base Station may, inside the Home Base Station, compare the received value or values with one or more values (preconfigured by the mobile network operator) stored in a memory that may be secured by a trusted execution environment. This solution may not desire an active connection between the MNO's core network and the H(e)NB. If the Home Base Station does not receive any valid operation control signal as described above from any of the possible sources, it may be desired (or required) to react in a certain way. According to various embodiments the Home Base Station may adjust its settings, reduce its service offerings or shut down operation completely.

In various embodiments, the operation control signals may not desire much bandwidth. Extremely low bitrates may be used, so the additional load they cause may be not of significance.

The Home Base Station may be enabled to detect if it has been moved to another location if the received operation control signals do not meet certain, predefined requirements.

According to an embodiment, in case the event of a movement has been detected, the Home Base Station may perform at least one pre-defined action, such as:
- inform the MNO's core network about the event of movement;
- ask for reconfiguration commands from the MNO's core network;
- reduce RF (radio frequency) transmission power (e.g. in the licensed frequency bands) until the operation control signals are altered to inform the Home Base Station that interference has been reduced satisfactorily;
- shut down operation (e.g. in the licensed frequency bands) completely; or
- tease customer with a 'punishment level' approach as will be described in more detail below.

According to an embodiment, the first mobile radio communication device 104 provided inside the area 102 may receive operation control signals indicating to the first mobile radio communication device 104 that it is operated inside the area 102. According to an embodiment, the second mobile radio communication device 106 provided outside the area 102 may not receive operation control signals, and thus may determine that it is not operated inside the area 102.

Based on determining that it is operated inside the area 102, the first mobile radio communication device 104 may execute a pre-defined action, while, based on determining that it is not operated inside the area 102, the second mobile radio communication device 106 may execute another pre-defined action.

According to various embodiments, the mobile radio communication devices, e.g. the first mobile radio communication device 104 and the second mobile radio communication device 106 in FIG. 1, may be implemented as a 'NodeB', which may be understood as a base station designed for Universal Mobile Telecommunication System (UMTS) that may be controlled by a Radio Network Controller (RNC). A NodeB may be capable of taking care of up to six UMTS radio cells. All NodeBs and all RNCs together may form the so-called UMTS Terrestrial Radio Access Network (UTRAN) of a Mobile Network Operator (MNO).

A current topic in the 3GPP standardization committees is the further development of 3G UMTS towards a mobile radio communication system optimized for packet data transmission by improving both system capacity and spectral efficiency. In 3GPP, the activities in this regard are summarized under the general term LTE (=Long Term Evolution). The aim for this future technology is—amongst others—to significantly increase the maximum net transmission rate, namely to 100 Mbps in the downlink transmission direction (tower to handset) and to 50 Mbps in the uplink transmission direction (handset to tower). To improve transmission via the air interface, various techniques have been specified.

MIMO (Multiple Input-Multiple Output) is one of the essential techniques in LTE. MIMO is an antenna technology in which up to 4 antennas (maximum configuration) may be used at both the eNodeB (base station in LTE) and UE (user equipment; mobile radio communication terminal) side. With MIMO multiple independent data streams can be transmitted in parallel using the same time-frequency resource. To distinguish the data streams sharing the same time-frequency resource at the receiving end, spatial division multiplexing may be applied.

Additionally, for LTE new multiple access methods have been specified. For the downlink transmission direction OFDMA (Orthogonal Frequency Division Multiple Access) in combination with TDMA (Time Division Multiple Access) has been specified. Uplink data transmission may be based on SC-FDMA (Single Carrier Frequency Division Multiple Access) in combination with TDMA. In practice, the transmitter and receiver of LTE devices may be realized using IFFT/FFT digital signal processing.

In 3GPP ($3^{rd}$ Generation Partnership Project), concepts are developed for supporting the deployment of so-called 'Home NodeBs' or 'Home eNodeBs' for the following Radio Access Technologies, for example:

3G UMTS (UMTS based on Code Division Multiple Access (CDMA), also referred to as 'UTRA' in 3GPP terminology);

and its successor technology 3.9G LTE (Long Term Evolution, also referred to as 'E-UTRA' in 3GPP terminology).

A Home NodeB (HNB) or Home eNodeB (HeNB) may be understood in accordance with 3GPP as a trimmed-down version of a base station optimized for use in residential or corporate environments (e.g., private homes, public restaurants or small office areas).

So-called Home Base Stations or Femto-Cells may be designed to be installed by the customer himself within his premises e.g., in a 'plug-and-play' manner. As the Femto Cell box may be physically solely under the control of the customer, it may be moved around and even carried to locations different from the customer's house.

From the customers perspective, Home NodeBs may offer the user a single mobile handset with a built-in personal phonebook for all calls, whether at home or elsewhere. Furthermore, for the user, there may be only one contract and one bill. Yet another effect of providing Home NodeBs may be seen in the improved indoor network coverage as well as in the increased traffic throughput. Moreover, power consumption may be reduced as the radio link quality between a handset and a Home Base Station may be better than the link between a handset and legacy NodeB.

In an embodiment, access to a Home NodeB may be allowed for a closed user group only, i.e. the communication service offering may be restricted to employees of a particular company or family members, in general, to the members of the closed user group. This kind of Home Base Stations may be referred to as 'Closed Subscriber Group Cells' (CSG Cells) in 3GPP. A cell which indicates being a CSG Cell may need to provide its CSG Identity to the UEs (user equipments, e.g. a mobile radio communication terminal, e.g. a mobile phone, e.g. a mobile personal digital assistant equipped with mobile radio communication functionality, e.g. a mobile personal computer equipped with mobile radio communication functionality). Such a cell may only be suitable for a UE if its CSG identity is in the UE's CSG white list (a list of CSG identities maintained in the UE or in an associated smart card indicating the cells which a particular UE is allowed to use for communication).

As a Femto Cell entity or Home Base Station entity may be a box of small size and physically under control of the user, in other words, out of the MNO's domain, it may be used nomadically, i.e. the user may decide to operate it in his apartment, but also in a hotel when he is away from home, e.g. as a business traveler. Additionally a Home NodeB may be operated only temporarily, i.e. it may be switched on and off from time to time, e.g. because the user may not want to operate it over night or when he leaves his apartment. The operation modes described here represent new challenges to the MNO's mobile radio core network. Legacy Base Stations may be operated permanently at a fixed location, and the MNO may allocate a different set of radio resources (e.g., carrier frequencies, time slots and/or codes, etc.) to neighboring NodeBs or eNodeBs in his mobile radio communication network in order to minimize mutual interference between them.

For the Mobile Network Operator (MNO) this nomadic use case may be of certain disadvantages, because some kind of reliable 'proof of location' may be desired in some countries. If this cannot be guaranteed, regulatory requirements may not be met (due to H(e)NBs causing heavy interferences), or emergency calls may not be traced back to where they were initiated.

In various embodiments, a movement detection process for Home Base Stations may be provided.

In various embodiments, the granularity of movement detection may depend on the method according to various embodiments (rough granularity may be achieved if the operation control signals are sent out over a TV or radio broadcasting system; while a finer granularity may be achieved by utilizing macro cells of a mobile radio communication system).

In an embodiment, the Home Base Station may evaluate operation control signals that it may have received over at least one of the Home Base Station's interfaces (e.g., wirelessly over a macro cell in its vicinity or over a TV or radio broadcast station within its reach).

In various embodiments, the operation control signals may be coded to contain time variant and/or location dependent pieces of information. In one embodiment a operation control signal may include date and time information that may be encrypted by the macro cell base station or TV/radio broadcasting system with a locally unique (e.g., cell specific) encryption key.

In various embodiments, the Home Base Station may be configured with a list of allowed operation control signals and may compare the operation control signals received with the configured list. In an embodiment, this may be carried out in a trusted execution environment inside the Home Base Station.

In an embodiment, if the operation control signals do not meet a first criterion (e.g., are not part of the list mentioned above), a predefined action may be triggered by the trusted execution environment inside the Home Base Station (e.g., a command may be issued to stop operations in the licensed frequency bands).

The Home Base Station may continue receiving and evaluating further operation control signals.

If the operation control signals meet a second criterion, another predefined action may be triggered by the trusted execution environment inside the Home Base Station (e.g., a command may be issued to start operation in the licensed frequency bands again).

In one embodiment the operation control signals may include a set of basic configuration parameters that may be valid for a long period of time plus a set of special configuration parameters that may only have a limited lifecycle. Delta signaling (i.e. only those portions of a set of information need to be conveyed that have changed compared to the set of information submitted previously) may be used whenever appropriate.

In various embodiments, the location of a Home Base Station in operation may be tracked by a suitable core network entity in order to identify whether a given Home Base Station is functioning within a virtual boundary imposed by the Mobile Network Operator (MNO). These boundaries may be geographical areas (e.g., made up of a macro cell cluster) defined by the MNO.

If a Home Base Station turns out to perform operations beyond the virtual boundary imposed, various levels of reminders may be introduced; an initial reminder may be an informal indicator delivered by the network to the Home Base Station; if the Home Base Station continues an operation beyond its operational boundaries, the network may finally exclude the Home Base Station from the network. In various embodiments, a reminder may be a notification which e.g. may be displayed to all users or a subset of users, the HBS provides services to. In particular the notification may be displayed to the owner of the Home Base Station, regardless of whether the owner is currently in coverage of the corresponding Home Base Station or any another mobile radio cell).

The approach according to various embodiments may be combined with the 3GPP SA3 (a working group that is responsible for the security of 3GPP systems) approach, which may desire an active connection between the MNO's core network and the H(e)NBs and will be explained below. For example, densely populated areas may be provided with a complex H(e)NB deployment for the 3GPP SA3 approach and for all other cases the methods and devices according to various embodiments may be used.

Dynamic switching between the 3GPP SA3 approach (requiring an active connection between the MNO's core network and the H(e)NBs) and various embodiments may be provided. In particular, the default configuration may include a deployment following various embodiments. If ever there is an issue related to a dense H(c)NB network within a given location (which may be identified by a high level of interference between H(e)NBs, etc.), the network may request from the relevant H(e)NBs to change their configuration correspondingly (i.e. following the current 3GPP SA3 approach). If a formerly dense H(e)NB network in a given location is not "dense" any more (e.g. multiple users may switch off H(e)NBs during the summer break, etc.), the configuration may be transformed from the 3GPP SA3 approach to an approach according to various embodiments, which may be economically more efficient.

Alternatively, the Home Base Station may be configured with a list of allowed locations (e.g., GPS (Global Positioning System) data plus maximum tolerance) and may derive its current location from the operation control signals received (e.g., GPS data indicating the position of the macro cell) in order to decide if it is (still) allowed to operate in its current location.

In various embodiments, methods to control the operation of a Home Base Station (especially the use of frequencies in the licensed bands) may be provided. In various embodiments, the Home Base Station may include a receiving circuit configured to receive operation control signals over at least on interface. In various embodiments, the Home Base Station may include a control circuit (which may be a trusted execution environment) configured to evaluate the operation control signals being received by the receiving circuit. In various embodiments, the control circuit may issue a command if at least one predefined criterion is not met by the operation control signals to an execution circuit. In various embodiments, the execution circuit may perform at least one predefined action upon reception of a command issued by the control circuit.

In various embodiments, the operation control signals may be embedded in the U-Plane and/or C-Plane data of a wireless communication system. In other words: the operation control signals may be received of the U-Plane and/or C-Plane data of a wireless communication system In various embodiments, the operation control signals may be conveyed wirelessly by a neighboring (macro and/or femto cell) base station via (in other words: over) a cellular radio link.

In various embodiments, the operation control signals may be embedded in the data stream of a wireless multicast or broadcast system. In other words: the operation control signals may be received of the data stream of a wireless multicast or broadcast system.

In various embodiments, the data stream may be conveyed wirelessly over (in other words: via) a TV or radio broadcast system.

In various embodiments, the operation control signals may be time variant, or may contain data that allow derivation of time-related information.

In various embodiments, the operation control signals may be location dependent, or may contain data that allow derivation of location-related information.

In various embodiments, the action performed by the decision circuit may include at least one of the following:
  the Home Base Station may inform the MNO about the occurrence of an event;
  the Home Base Station may request reconfiguration from the MNO;
  the Home Base Station may reduce or may increase transmission power in a certain band;
  the Home Base Station may change bandwidth or may change carrier frequency;
  the Home Base Station may stop or may resume operating in a licensed frequency bands; and
  the Home Base Station may stop or may resume all operations.

In various embodiments, methods in which 'virtual boundaries' inside a PLMN (Public Land Mobile Network) may be defined by the MNO may be provided. The mobile radio macro cells spanning a virtual PLMN area may send out at least one common criterion with the operation control signals.

In various embodiments, the pre-defined actions to be performed when certain criteria are repeatedly not met may be steps of a 'Punishment Level Approach' to raise the pain for the user gradually. In one embodiment a pause of operation may be made longer with each step. In another embodiment bandwidth may be reduced with each step.

Figure 2:
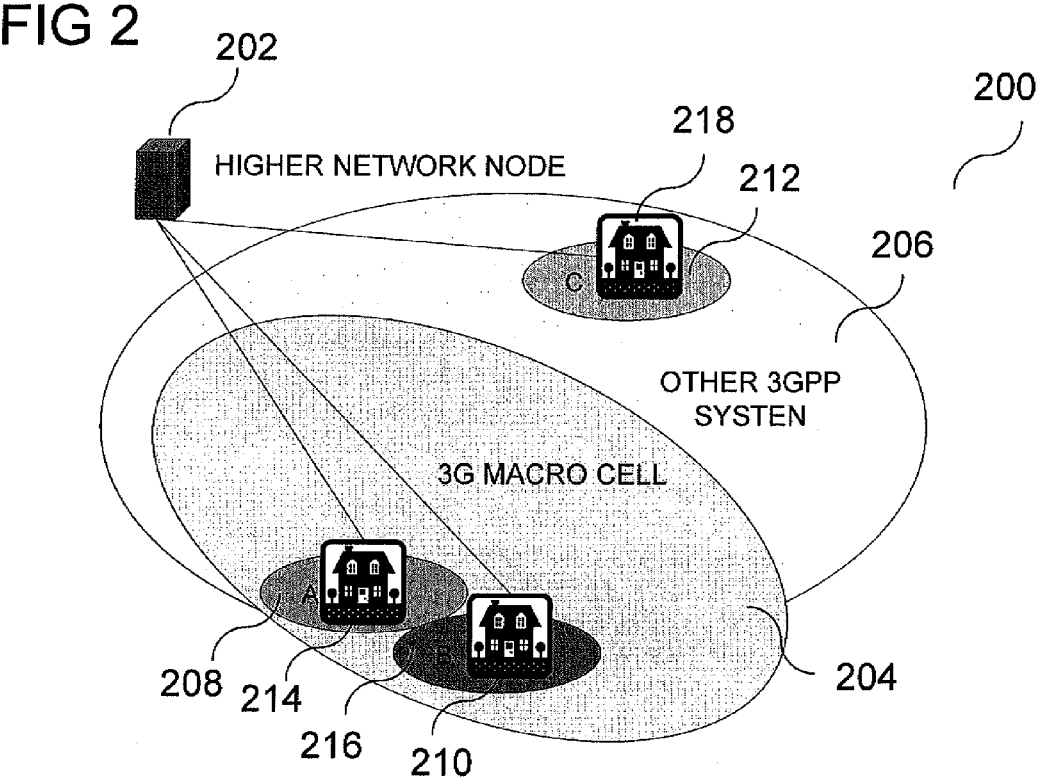
FIG. 2 shows a possible deployment scenario for three Home NodeBs in accordance with an embodiment.

FIG. 2 shows a possible deployment scenario for three Home NodeBs in accordance with an embodiment in an illustration 200.

In this example, a higher network node 202 is shown, which symbolizes all entities of the mobile radio system provided "above" the NodeBs and Home NodeBs. Furthermore, FIG. 2 shows a first mobile radio macro cell 204, provided by a first provider in accordance with a first 3GPP mobile radio communication system, and a second mobile radio macro cell 206, provided by a second provider in accordance with a second 3GPP mobile radio communication system. The first and second providers may be the same provider or different providers. Furthermore, the first and second 3GPP mobile radio communication systems may be the same 3GPP mobile radio communication system or different 3GPP mobile radio communication systems. In an example, the first 3GPP mobile radio communication system may be an LTE mobile radio communication system, and the second 3GPP mobile radio communication system may be a UMTS mobile radio communication system. However, the embodiments are not limited to neither LTE nor UMTS, not even to a 3GPP mobile radio communication system. Any other suitable mobile radio communication system may be used in the context of the described embodiments, e.g. any suitable Licensed Mobile Access mobile radio communication system, such as e.g. a Freedom of Mobile Multimedia Access (FOMA) mobile radio communication system or a Code Division Multiple Access 2000 (CDMA 2000) mobile radio communication system.

As also shown in FIG. 2, in each mobile radio macro cell 204, 206, there may be provided one or more mobile radio micro cells (in the following also referred to as Home NodeB cells) 208, 216, 212, which may be provided by respective Home NodeBs 214, 210, 218. The Home NodeBs 214, 210, 218, may be connected to the respective entities of the higher network node 202 in accordance with the technology provided in the respective mobile radio communication system.

Figure 3:
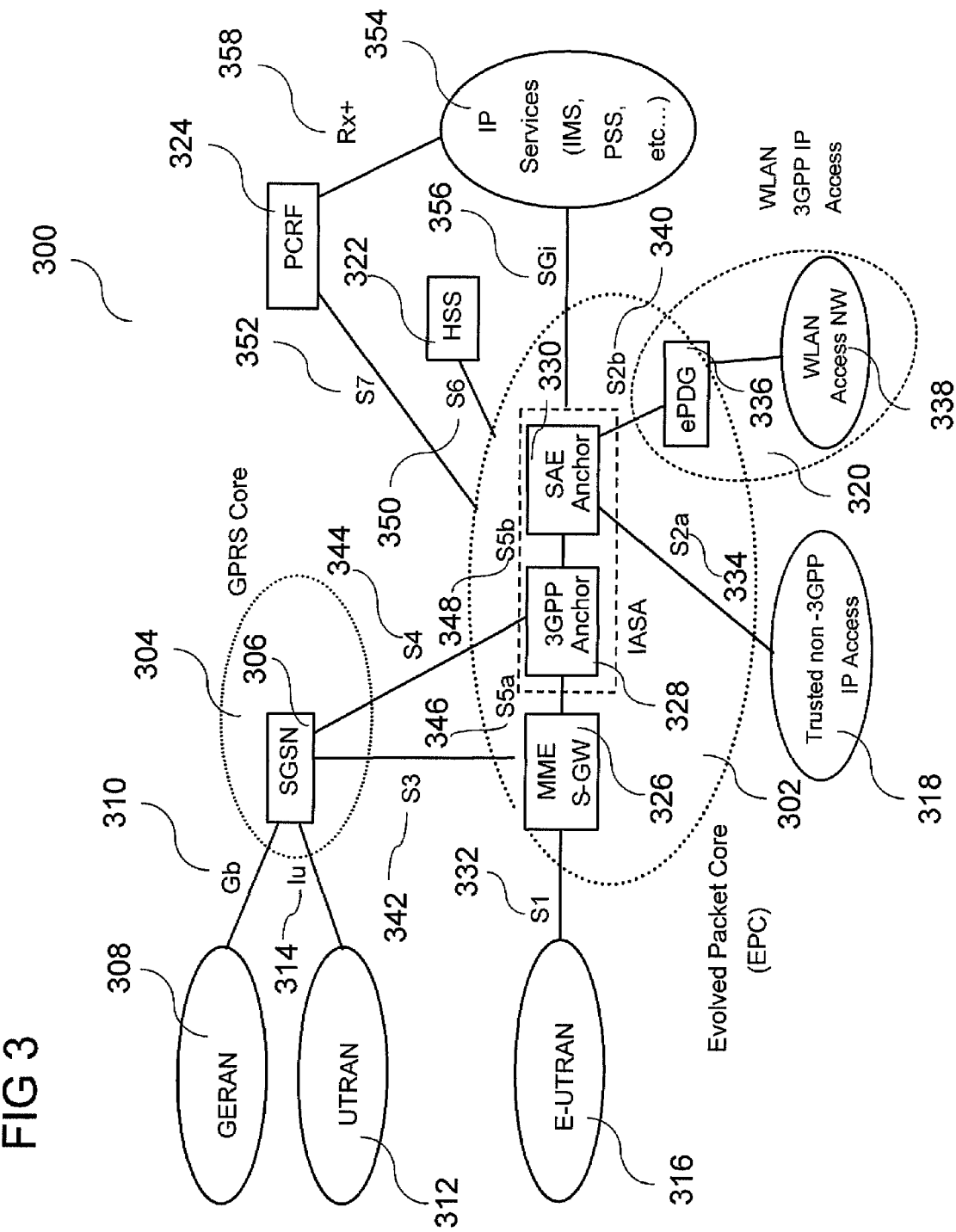
FIG. 3 shows an overview of the general 3GPP Network Architecture with three different Radio Access Networks in accordance with an embodiment.

FIG. 3 shows an overview of a general 3GPP Network Architecture 300 with three different Radio Access Networks (RANs). The 3GPP Network Architecture 300 may include an Evolved Packet Core (EPC) 302 and a General Packet Radio Service (GPRS) Core 304, which may be connected with each other by various interfaces, as will be described in more detail below. As shown in FIG. 3, the GPRS Core 304 may include a Serving GPRS Support Node (SGSN) 306, which may be coupled to different Radio Access Networks, such as e.g. to a GSM EDGE Radio Access Network (GE-RAN) 308 (which may also be referred to as 2G or 2.5G) via a Gb interface 310, and/or to a UMTS Terrestrial Radio Access Network (UTRAN) 312 via an Iu interface 314. In an embodiment, UTRAN stands for UMTS Terrestrial Radio Access Network and is a collective term for the NodeBs and Radio Network Controllers (RNCs) which make up the UMTS radio access network. This communications network, commonly referred to as 3G, can carry many traffic types from real-time Circuit Switched to IP based Packet Switched. The UTRAN may contain at least one NodeB that is connected to at least one Radio Network Controller (RNC). An RNC may provide control functionalities for one or more NodeB(s). A NodeB and an RNC may be the same device, although typical implementations may have a separate RNC located in a central location serving multiple NodeBs. An RNC together with its corresponding NodeBs are called the Radio Network Subsystem (RNS). There may be more than one RNS provided per UTRAN.

Furthermore, in an embodiment, the following entities or components may be provided in the general 3GPP Network Architecture 300:

an evolved UMTS Terrestrial Radio Access Network (E-UTRAN) 316;
a trusted non-3GPP Internet Protocol (IP) access network 318 and connected therewith trusted non-3GPP Internet Protocol (IP) devices, in other words, trusted non-3GPP devices which may access the EPC 302 using the Internet Protocol stack;
a Wireless Local Area network (WLAN) 3GPP Internet Protocol (IP) access network 320 and connected therewith Wireless Local Area network (WLAN) 3GPP Internet Protocol (IP) devices, in other words, WLAN 3GPP devices which may access the EPC 302 using the Internet Protocol stack;
a Home Subscriber Server (HSS) 322; and
a Policy and Charging Rules Function (PCRF) entity 324.

E-UTRAN may be understood as being the new 3GPP Radio Access Network for LTE (3.9G) that is currently being worked on. The proposed E-UTRA air interface may use OFDMA for the downlink transmission direction (tower to handset) and Single Carrier FDMA (SC-FDMA) for the uplink transmission direction (handset to tower). It may employ MIMO (Multiple-Input Multiple-Output) with a plurality of antennas, e.g. with up to four antennas per station. The use of OFDM (Orthogonal Frequency Division Multiplexing) may enable E-UTRA to be much more flexible in its use of spectrum than the older CDMA based systems, such as e.g. UTRAN. OFDM has a link spectral efficiency greater than CDMA, and when combined with modulation formats such as 64QAM (Quadrature Amplitude Modulation), and techniques as MIMO, E-UTRA may be more efficient than W-CDMA (Wideband CDMA) with HSDPA (High Speed Downlink Packet Access) and HSUPA (High Speed Uplink Packet Access).

Furthermore, as will be described in more detail below, the EPC 302 may include a Mobility Management Entity (MME) and a Serving Gateway (S-GW) (in FIG. 3 shown as one entity MME S-GW 326; however, the MME and the S-GW may also be implemented in separate devices), a 3GPP Anchor entity 328 and an SAE (System Architecture Evolution) Anchor entity 330.

In an embodiment, the E-UTRAN 316 may be connected to the MME S-GW 326 in the EPC 302 via an S1 interface 332.

Furthermore, the trusted non-3GPP IP entity 318 may be connected to the SAE Anchor entity 330 via an S2a interface 334. In an embodiment, the S2a interface 334 may be based on the Proxy Mobile IPv6 (PMIP) and in order to support accesses that do not support PMIP also Mobile IPv4.

The WLAN entity 320 may include an ePDG (Evolved Packet Data Gateway) 336 and a WLAN access network 338. The ePDG 336 may be connected to the SAE Anchor entity 330 via an S2b interface 340, which may provide the user plane with related control and mobility support between ePDG 336 and a Packet Data Network (PDN) Gateway of the EPC 302. In an embodiment, the S2b interface 340 may be based on the Proxy Mobile IPv6 (PMIP).

Furthermore, the SGSN 306 may be connected to the MME S-GW 326 in the EPC 302 via an S3 interface 342, which may provide and enable a user and bearer information exchange for inter 3GPP access network mobility in idle and/or active state. In an embodiment, the S3 interface 342 may be based on the GPRS tunneling protocol (GTP) and the Gn interface as it may be provided between SGSNs. The SGSN 306 may further be connected to the 3GPP Anchor entity 328 via an S4 interface 344, which may provide the user plane with related control and mobility support between the GPRS Core and the 3GPP Anchor function of the S-GW and may be based on the GTP protocol and the Gn reference point as provided between SGSN and GGSN.

The MME S-GW 326 may be connected to the 3GPP Anchor entity 328 via an S5a interface 346 and the 3GPP Anchor entity 328 may be connected to the SAE Anchor entity 330 via an S5b interface 348.

Furthermore, the HSS 322 may be connected to the EPC 302 via an S6 interface 350, which may provide or enable transfer of subscription and authentication data for authenticating/authorizing user access to the evolved system (AAA interface) between the MME and the HSS 322.

The PCRF 324 may be connected to the EPC 302 via an S7 interface 352, which may provide transfer of Quality of Service (QoS) policy and charging rules from the PCRF 324 to the Policy and Charging Enforcement Function (PCEF) in the PDN Gateway of the EPC 302. In an embodiment, the S7 interface 352 may be based on the Gx interface.

IP services such as e.g. (3G) IP Multimedia Subsystem (IMS), (3G) Packet Switches Streaming (PSS), etc., may be provided via an SGi interface 356 to the SAE Anchor entity 330 and/or via an Rx+ interface 358 to the PCRF 324. In an embodiment, the SGi interface 356 may be the interface between the PDN Gateway and the packet data network. The packet data network may be an operator external public or private packet data network or an intra operator packet data network, e.g. for provision of IP services such as e.g. of IMS. The SGi interface 356 may correspond to the Gi and Wi interfaces and support any 3GPP or non-3GPP access. The Rx+ interface 358 may correspond to the Rx interface and is the interface between the IP services and the PCRF 324.

In the following embodiment an LTE system (E-UTRAN) supporting the concept of Home eNodeBs is considered. It should be mentioned that the embodiments and examples described herein can easily be adapted to other Radio Access Technologies (RATs), such as UMTS (UTRAN) or GSM (GERAN) in alternative embodiments and examples. In E-UTRAN the eNodeBs are illustratively more intelligent than legacy NodeBs of a UTRAN system, since almost all the RNC functionality has been moved to the eNodeB.

Figure 4:
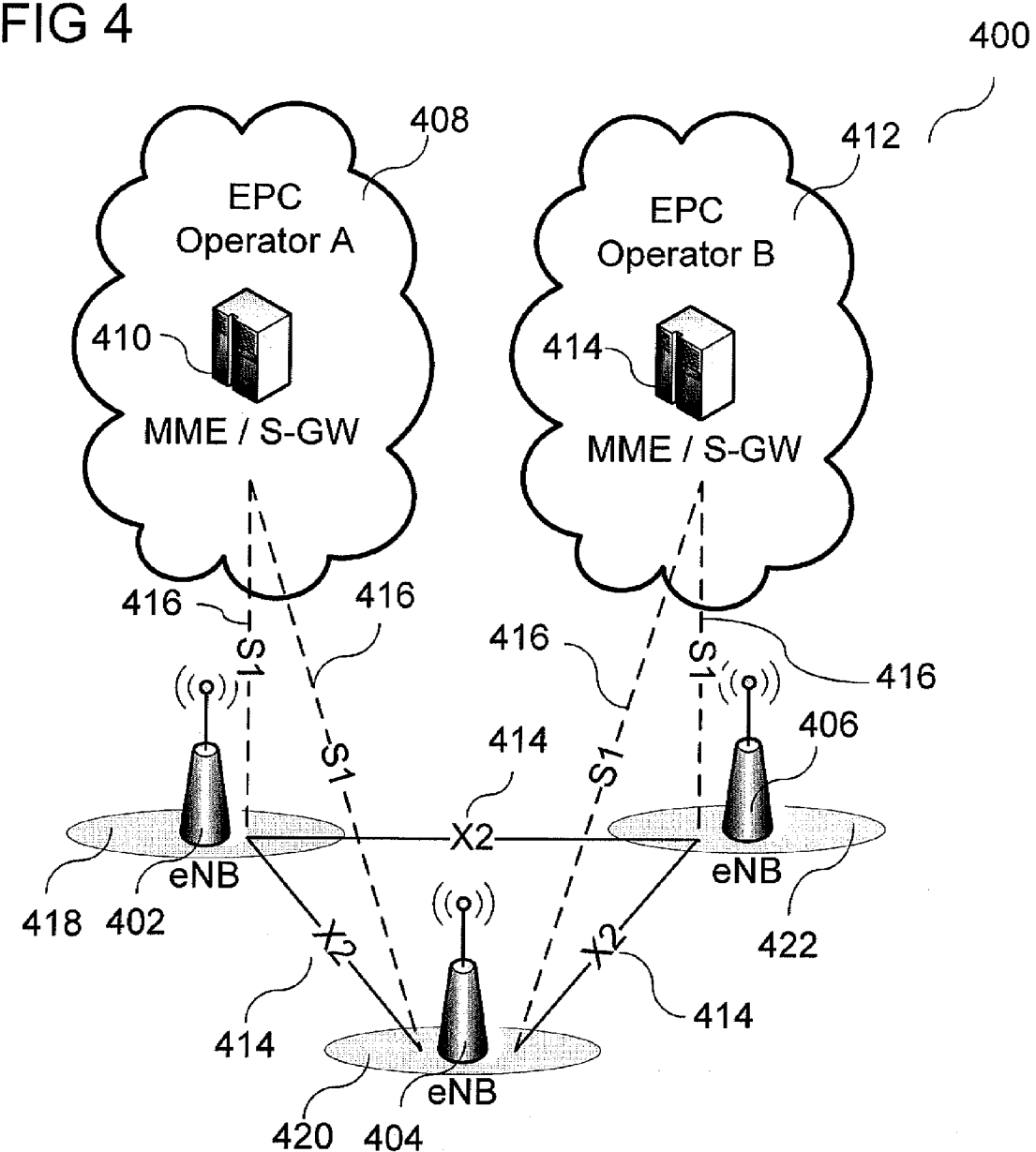
FIG. 4 shows an E-UTRAN architecture in accordance with an embodiment.

FIG. 4 shows an example E-UTRAN architecture 400 including three eNodeBs 402, 404, 406, two Evolved Packet Cores (EPCs), e.g. a first EPC 408, provided by a first operator A and including a first MME/S-GW 410, and a second EPC 412, provided by a second operator B and including a second MME/S-GW 414. In LTE, the eNodeBs 402, 404, 406, are interconnected with each other by means of the X2 interfaces 414. Furthermore eNodeBs 402, 404, 406, are connected by means of the S1 interfaces 416 to the MME/S-GW 410, 414, of the respective EPC 408, 412. The S1 interface 416 as defined by 3GPP may support a many-to-many relation between EPC 408, 412, and eNodeB 402, 404, 406, i.e. theoretically different operators may simultaneously operate the same eNodeB 402, 404, 406. The eNodeBs 402, 404, 406, may provide mobile radio coverage for the radio communication terminal device located in the respective mobile radio cells 418, 420, 422.

Figure 5:
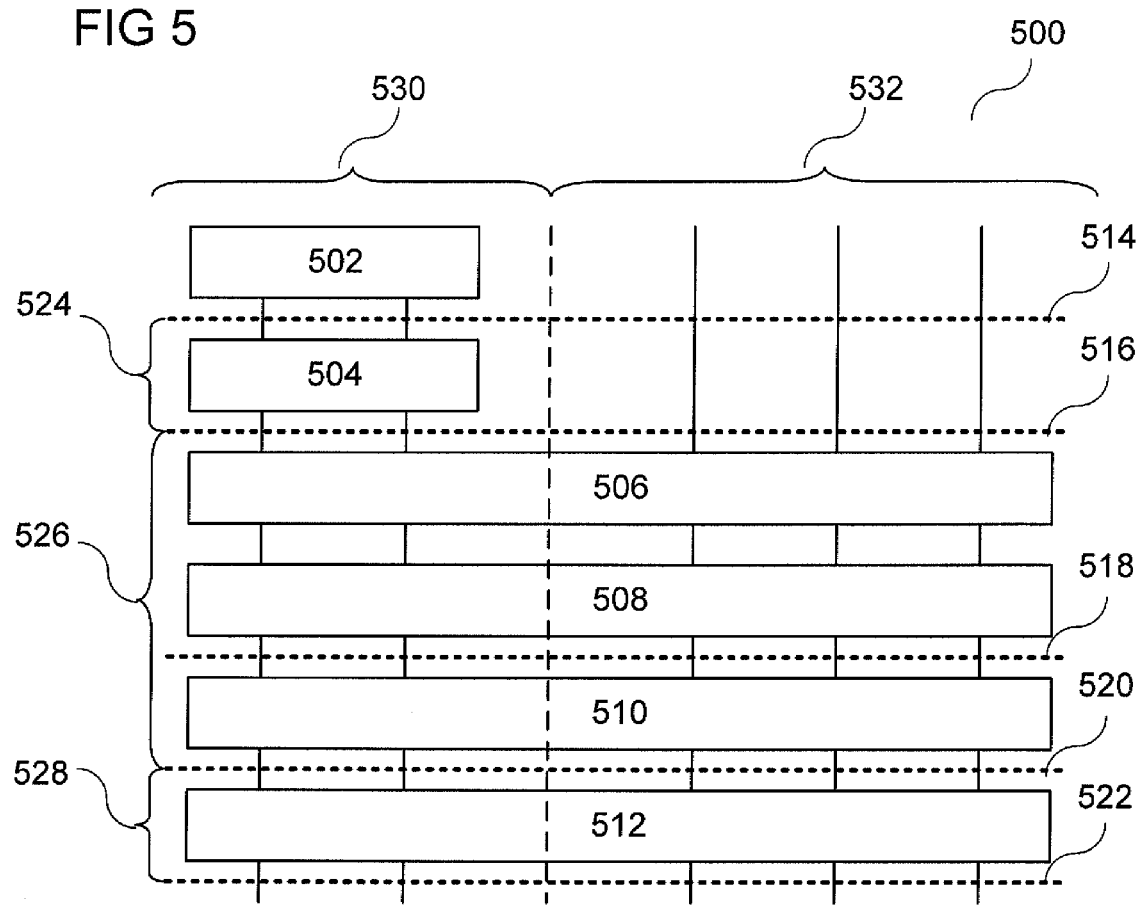
FIG. 5 shows a protocol stack of the 3GPP LTE (Long Term Evolution) system in accordance with an embodiment.

FIG. 5 shows a protocol stack 500 of the 3GPP LTE (Long Term Evolution) system in accordance with an embodiment. Below the non-access stratum (NAS) 502, Layer 3 (524) including the Radio Resource Control (RRC) sublayer (504) may be provided.

The protocol stack 500 may be split into the C-Plane 530 and the U-Plane 532.

A Layer 2 (526) of the protocol stack 500 may be split into the following sublayers: Medium Access Control (MAC) 510, Radio Link Control (RLC) 508 and Packet Data Convergence Protocol (PDCP) 506.

The Service Access Points (SAPS) between the physical layer 512 included in Layer 1 (528) and the MAC sublayer 510 may provide the transport channels 520. The SAPs between the MAC sublayer 510 and the RLC sublayer 508 may provide the logical channels 518. The SAPs between the PDCP sublayer 506 and the RRC sublayer 504 may provide the radio bearers 516. The SAPs between the RRC sublayer 504 and the NAS 502 may provide the SAE bearers (System Architecture Evolution) 514. The SAPs below the physical layer 512 may provide the physical channels 522. The multiplexing of several logical channels (e.g. radio bearers) on the same transport channel (e.g. transport block) may be performed by the MAC sublayer 510. In both uplink and downlink, only one transport block may be generated per TTI (Transmission Time Interval) in the non-MIMO case.

In an embodiment, the RRC protocol layer 504 making up the C-Plane (control plane) 530 of the system may be of particular relevance. The main services and functions of the RRC sublayer 504 may include:

Broadcast of System Information related to the non-access stratum (NAS);

Broadcast of System Information related to the access stratum (AS);

Paging;

Establishment, modification and release of an RRC connection between the UE and E-UTRAN including: Allocation of temporary identifiers between UE and E-UTRAN; Configuration of signaling radio bearer(s) (SRB) for RRC connection: Low priority SRB and high priority SRB;

Security functions including key management;

Establishment, configuration, maintenance and release of point to point Radio Bearers;

Mobility functions including: UE measurement reporting and control of the reporting for inter-cell and inter-RAT mobility; Inter-cell handover; UE cell selection and reselection and control of cell selection and reselection; Context transfer between eNBs;

QoS management functions;

UE measurement reporting and control of the reporting; and

NAS direct message transfer to/from NAS from/to UE.

The RRC sublayer 504 may be used to broadcast System Information in the downlink. Generally speaking System Information (SI) may be an RRC message carrying a number of System-Information-Blocks (SIBs) that may have the same scheduling requirements (i.e. periodicity). There may be more than one System Information (SI) RRC message transmitted with the same periodicity.

Each SIB may contain a set of related system information parameters. Several SIBs may be provided in accordance with 3GPP including the Master-Information-Block (MIB), that may include a limited number of most frequently transmitted parameters, and SIB Type 1 may contain the scheduling information that mainly may indicate when the other System Information (SI) RRC messages are transmitted, i.e. their start times.

SYSTEM INFORMATION MASTER (SI-M) and SYSTEM INFORMATION 1 (SI-1) may be special versions of a System Information (SI) RRC message only carrying a single SIB, namely the MIB and the SIB Type 1 respectively. The SI-M message may be carried on BCH (Broadcast Channel, one of the downlink transport channel) while all other System Information (SI) RRC messages including SI-1 may be carried on DL-SCH (Downlink Shared Channel, another one of the downlink transport channels).

Both the SI-M and SI-1 may use a fixed schedule with a periodicity of 40 and 80 ms respectively. The first transmission of the SI-M may be scheduled in radio frames for which the SFN mod 4=0. SI-1 may be scheduled in radio frames for which the SFN mod 8=0. Moreover, SI-1 may be scheduled in sub-frame #5.

The scheduling of System Information (SI) RRC message other than SI-M and SI-1 may be flexible, i.e. dynamic scheduling may be used: the UE may acquire the detailed time-domain and frequency domain scheduling (as well as other information, such as the transport format used) of these System Information (SI) RRC messages from the PDCCH (Physical Downlink Control Channel). It may be possible that the PDCCH does not indicate which System Information (SI) RRC message is scheduled, i.e. a single SI-RNTI (System Information Radio Network Temporary Identifier) may be used for all different types of System Information (SI) RRC messages.

Each System Information (SI) RRC message may be transmitted in a periodically occurring (time domain) window, having a defined semi-static starting point and length. The SI-windows may be non-overlapping and the size of all SI-windows may be the same. SI-1 may configure the SI-window length and the transmission periodicity for the other System Information (SI) RRC messages.

A SIB may not be spread over multiple consecutive System Information (SI) RRC messages, but—as far as the SIB Types 2-11 are concerned—one System Information (SI) RRC messages may include multiple SIBs (if those have the same periodicity). The mapping of SIBs onto System Information (SI) RRC messages may be flexible; it may be configured in the SI-1 message. Table 1 gives an overview of the different types of System Information (SI) RRC messages.

indicate old system information and the blocks 614 indicate new system information. The n-th BCCH (Broadcast Control Channel) modification period 602 may be used to transmit change notification. The (n+1)-th BCCH modification period 606 may be used to transmit updated information.

When the network changes (some of the) system information, it first may notify the UEs about this change i.e. this may be carried out throughout a modification period. In the next modification period, the network may transmit the updated system information.

Upon receiving a change notification, the UE may know that the current system information is valid until the next modification period boundary. After this boundary, the UE may acquire the new system information. There may be a (short) period during which the UE may not have valid system information.

For UEs in RRC_IDLE the PAGING message may be used to inform it about a system information change. UEs in RRC_CONNECTED may be desired to monitor the PDCCH at a periodic occasion specifically defined for this purpose i.e. a 'Connected mode system information change notification' occasion. If the UE detects the System-Information-Change-RNTI (SC-RNTI) on PDCCH, it may know that the system information changes at the next modification period boundary. Although the UE may be informed about changes in system information, no further details may be provided e.g. regarding which System Information (SI) RRC message has changed. It is possible to not use the change notification mechanism for those system information using an expiry timer (intended for the more dynamic system information).

TABLE 1

System Information Overview

| System Information RRC Message | Content | Purpose | Periodicity | First Transmission | Repetitions |
|---|---|---|---|---|---|
| SI-M | One MIB | most essential physical layer info of the cell desired to receive further system info | fixed, 40 ms | in subframe #0 of radio frame for which the SFNmod4 = 0 | in subframe #0 of all other radio frames |
| SI-1 | one SIB Type 1 | info relevant to cell access and scheduling of other SIBs | fixed, 80 ms | in subframe #5 of radio frame for which the SFNmod8 = 0 | in subframe #5 of all other radio frames for which SFNmod2 = 0 |
| SI | multiple SIBs (Type 2-11) | various purposes depending on SIB Type | flexible | in dynamically scheduled SI window; UE may acquire details about scheduling from decoding SI-RNTI on PDCCH | |

System information changes may only occur at specific radio frames i.e. the concept of a modification period may be used. System Information (SI) RRC messages may be transmitted a number of times with the same content within a modification period, as defined by its scheduling. The modification period boundaries may be defined by SFN mod N. N may be configured by system information.

Figure 6:
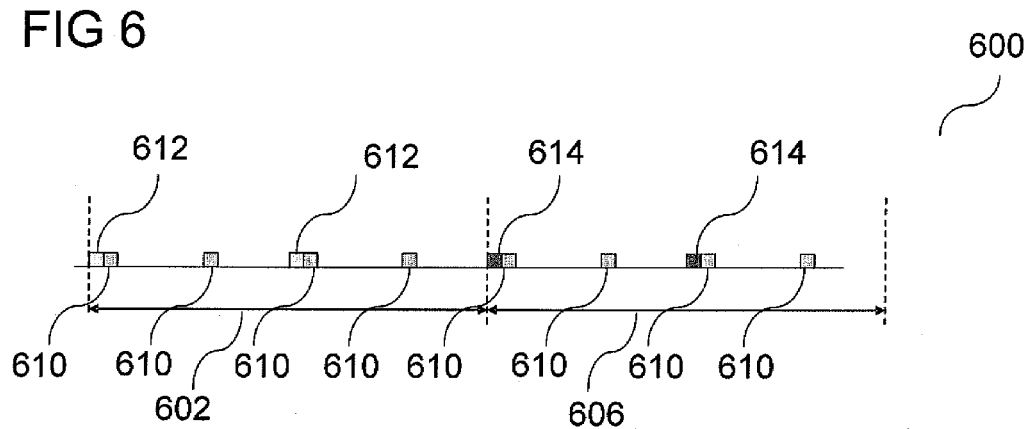
FIG. 6 shows a diagram illustrating a change of system information in accordance with an embodiment.

FIG. 6 shows a diagram illustrating a change of system information in accordance with an embodiment. For the example shown in FIG. 6, the blocks 610 indicate the frame periodicity (N=4 in the example in FIG. 6). The blocks 612

The SI-1 message may include a value tag that may indicate if a change has occurred in system information other than the SI-M and SI-1. UEs may use this value tag e.g. upon return from out of coverage, to verify if the previously acquired system information is still valid. The UE may consider system information to be valid for at most 6 hours from the moment it was received.

In accordance with 3GPP, a MasterInformationBlock which may inform the UE about the most essential physical layer parameters of the mobile radio cell that are desired by a UE to receive further system information may be defined in various embodiments. Some physical layer parameters which may be provided in various embodiments are:
- dl-SystemBandwidth (details are for further study);
- numberOfTransmitAntennas (BIT STRING (SIZE (4));
- phich-Configuration (PHICH-Configuration); and
- systemFrameNumber (BIT STRING (SIZE (8)).

Additionally, in 3GPP a SystemInformationBlock1 that may contain information relevant when evaluating if a UE is allowed to access a cell and defines the scheduling of other System Information Blocks (SIBs) is defined. Currently the list of information elements in this container includes the items shown in Table 2.

TABLE 2

Information Elements included in SystemInformationBlock1

| | |
|---|---|
| ▪ cellAccessRelatedInformation | SEQUENCE |
| ○ plmn-IdentityList | SEQUENCE (1 ... 6) |
| ▪ plmn-Identity | PLMN Identity |
| ▪ cellReservedForOperatorUse | ENUMERATED {reserved, notReserved} |
| ○ trackingAreaCode | Tracking Area Code |
| ○ cellIdentity | Cell Identity |
| ○ cellBarred | ENUMERATED {barred, notBarred} |
| ○ intraFrequencyCellReselection | BOOLEAN |
| ○ cellReservationExtension | ENUMERATED {reserved, notReserved} |
| ○ csg-Indication | BOOLEAN |
| ▪ cellSelectionInfo | SEQUENCE |
| ○ q-Rxlevmin | INTEGER (-60 ... -28) |
| ○ q-Rxlevminoffset | INTEGER (1 ... 8) |
| ▪ frequencyBandIndicator | INTEGER (1 ... 64), |
| ▪ schedulinInformation | SEQUENCE (1 ... maxSI-Message) |
| ○ si-Periodicity | ENUMERATED{ms80, ms160, ms320, ... , ms5120}, |
| ○ sib-MappingInfo | SEQUENCE (1 ... maxSIB) OF SIB-Type |
| ▪ tdd-Configuration | TDD-Configuration |
| ▪ si-WindowLength | ENUMERATED (value range is for further study) |
| ▪ systemInformationValueTag | INTEGER (value range is for further study) |

In 3GPP further SystemInformationBlocks for various purposes are defined. These may be referred to as SIB Types 2-11 in 3GPP. Each of them may contain a number of different Information Elements (IE).

SIB-Type2 may contain common and shared channel information.

SIB-Type3 may contain cell re-selection information, mainly related to the serving cell.

SIB-Type4 may contain information about the serving frequency and intra-frequency neighboring cells relevant for cell re-selection. This may includes cell re-selection parameters common for a frequency as well as cell specific re-selection parameters.

SIB-Type5 may contain information about other E-UTRA frequencies and inter-frequency neighboring cells relevant for cell re-selection. This may includes cell re-selection parameters common for a frequency as well as cell specific re-selection parameters.

SIB-Type6 may contain information about UTRA frequencies and UTRA neighboring cells relevant for cell re-selection. This may include cell re-selection parameters common for a frequency as well as cell specific re-selection parameters.

SIB-Type7 may contain information about GERAN frequencies relevant for cell re-selection. This may include cell re-selection parameters for each frequency.

SIB-Type8 may contain information about CDMA2000 frequencies and CDMA2000 neighboring cells relevant for cell re-selection. This may include cell re-selection parameters common for a frequency as well as cell specific re-selection parameters.

SIB-Type9 may contain a Home eNodeB identifier (HN-BID) coded in UTF-8 with variable number of bytes per character to allow the owner of a Home Base Station to submit his own text over the air (for example 'Griswold Family').

SIB-Type10 may contain an ETWS (Earthquake and Tsunami Warning System) primary notification.

SIB-Type11 may contain an ETWS secondary notification.

As indicated above, the operation control signals (OCS) may be conveyed to a Home Base Station over an air interface by making use of the mobile communications RRC protocol. This method may desire the Home Base Station to behave as a UE to some extend (it may be desired to have an UE-like RF receiver and UE-like embodiments of the various protocol layers up to the RRC protocol layer), but it may have the effect that the N1 interface between the Core Network and the Wireless Broadcast System may not be needed (the N1 interface will be described in more detail further below). In various embodiments, enhancements of the LTE System Information that may be desired to achieve the desired behavior are set forth in the following.

The SystemInformationBlock1 may include information relevant for a UE when it desires to evaluate if it is allowed to access a cell. Furthermore it may define the scheduling of other System Information Blocks (SIBs). In various embodiments, SystemInformationBlock1 may also be received (for instance from a mobile radio macro cell of the cellular communication system) and processed by the Home Base Station.

In various embodiments, SIB-Type1 may be enhanced with some new Information Elements (IE) according to the explanations above. The IE OperationControlSignal may include location dependent data according to an embodiment. The IE OperationControlSignal may also be time variant as a whole (i.e. it may be changed after a certain period of time) or may include a time variant piece of information with an indication pertaining to the validity of the IE as a whole. It may for instance be encoded as Integer or as a Text String.

The new additions to SIB-Type1 are bordered in Table 3.

TABLE 3

Enhancement of SIB-Type 1

| | |
|---|---|
| ▪ cellAccessRelatedInformation | SEQUENCE |
| ○ plmn-IdentityList | SEQUENCE (1 ... 6) |
| ▪ plmn-Identity | PLMN Identity |
| ▪ cellReservedForOperatorUse | ENUMERATED {reserved, notReserved} |
| ○ trackingAreaCode | Tracking Area Code |
| ○ cellIdentity | Cell Identity |
| ○ cellBarred | ENUMERATED {barred, notBarred} |
| ○ intraFrequencyCellReselection | BOOLEAN |
| ○ cellReservationExtension | ENUMERATED {reserved, notReserved} |
| ○ csg-Indication | BOOLEAN |
| ○ OperationControlSignal | INTEGER or OCTET STRING (SIZE(to be defined)) |
| ▪ cellSelectionInfo | SEQUENCE |
| ○ q-Rxlevmin | INTEGER (-60 ... -28) |
| ○ q-Rxlevminoffset | INTEGER (1 ... 8) |
| ▪ frequencyBandIndicator | INTEGER (1 ... 64), |
| ▪ schedulinInformation | SEQUENCE (1 ... maxSI-Message) |
| ○ si-Periodicity | ENUMERATED{ms80, ms160, ms320, ... , ms5120}, |
| ○ sib-MappingInfo | SEQUENCE (1 ... maxSIB) OF SIB-Type |
| ▪ tdd-Configuration | TDD-Configuration |
| ▪ si-WindowLength | ENUMERATED (value range is for further study) |
| ▪ systemInformationValueTag | INTEGER (value range is for further study) |

In various embodiments, a new SystemInformationBlock including the Information Element (IE) defined above may be defined (e.g., as a SIB-Type12).

Figure 7:
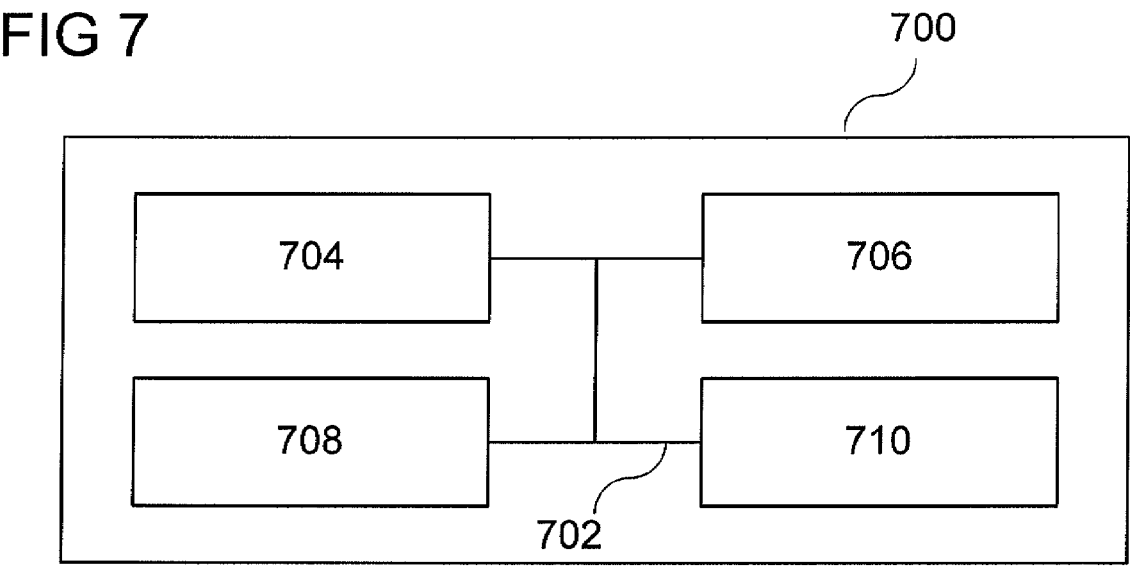
FIG. 7 shows a mobile radio communication device in accordance with an embodiment.

FIG. 7 shows a mobile radio communication device 700 in accordance with an embodiment.

The mobile radio communication device 700 may include a mobile radio communication protocol circuit 704 configured to provide a mobile radio base station function for a mobile radio communication with another mobile radio communication device; a network control interface circuit 706 configured to receive time dependent or location dependent operation control signals from a network device such as e.g. from a mobile radio communication network device or, in general, a wireless broadcast system including a wireless broadcast transmitter as an implementation of a network device, containing data that enables determination of at least one piece of location-related information and/or at least one piece of time-related information; a localization circuit 708 configured to determine at least one piece of time-related information and/or at least one piece of location-related information of the mobile radio communication device based on the operation control signals received by the network control interface circuit 706; and an execution circuit 710 configured to execute a pre-defined action to control the mobile radio communication protocol circuit based on the time-related piece of information or the location-related piece of information determined by the localization circuit 708.

The mobile radio communication protocol circuit 704, the network control interface circuit 706, the localization circuit 708, and the execution circuit 710 may be coupled with each other, e.g. via an electrical connection 702 such as e.g. a cable or a computer bus or via any other suitable electrical connection to exchange electrical signals.

Although the mobile radio communication protocol circuit 704, the network control interface circuit 706, the localization circuit 708, and the execution circuit 710 are shown as separate circuits in the example of FIG. 7, two or more of the circuits may be provided as a single circuit providing the functionality of the two or more of the circuits.

Figure 8:
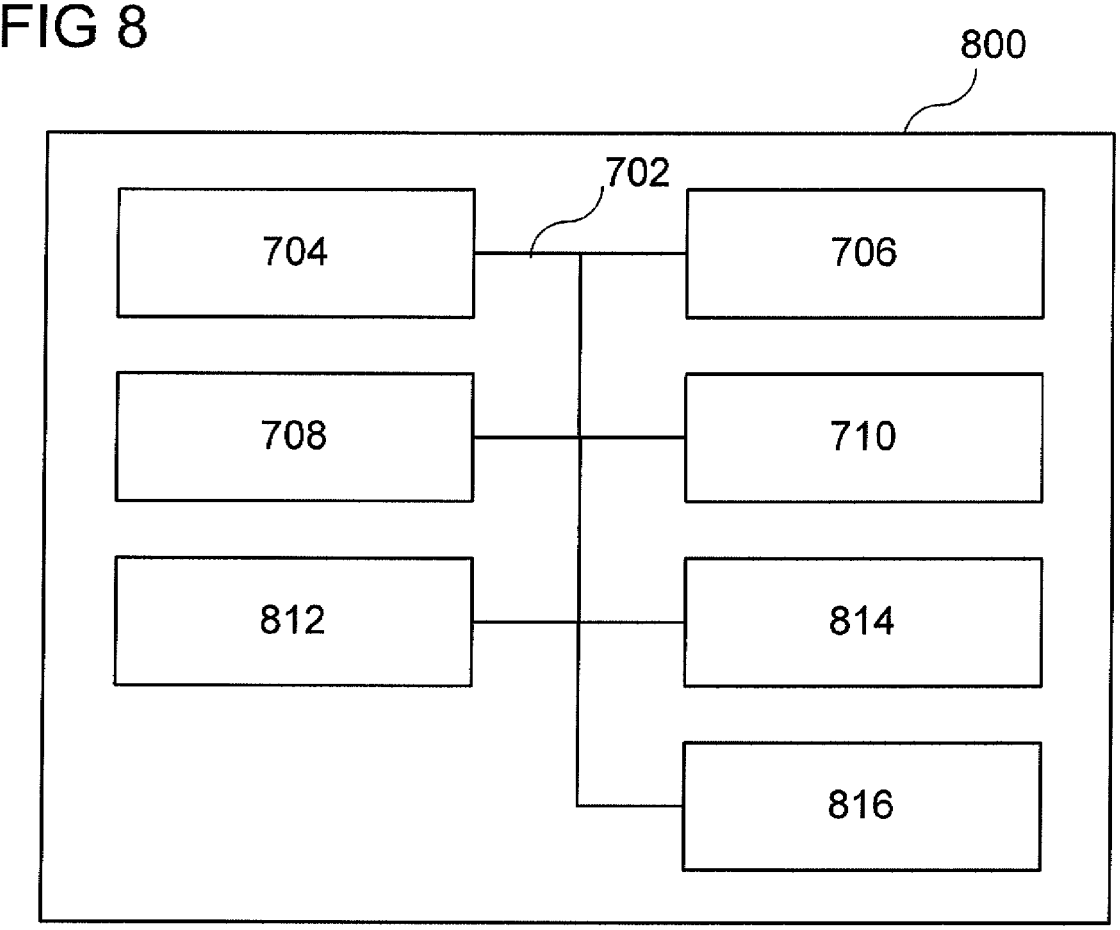
FIG. 8 shows a mobile radio communication device in accordance with an embodiment.

FIG. 8 shows a mobile radio communication device 800 in accordance with an embodiment.

In an embodiment, the mobile radio communication device 800 may include, like the mobile radio communication device 700 of FIG. 7, a mobile radio communication protocol circuit 704 configured to provide a mobile radio base station function for a mobile radio communication with another mobile radio communication device; a network control interface circuit 706 configured to receive time dependent or location dependent operation control signals from a network device, such as e.g. a mobile radio communication network device, containing data that enables determination of at least one piece of location-related information and/or at least one piece of time-related information; a localization circuit 708 configured to determine at least one piece of time-related information and/or at least one piece of location-related information of the mobile radio communication device based on the operation control signals received by the network control interface circuit 706; an execution circuit 710 configured to execute a pre-defined action to control the mobile radio communication protocol circuit based on the piece of time-related information or the piece of location-related information determined by the localization circuit 708; and an electrical connection 702.

The mobile radio communication device 800 may further include a criterion evaluation circuit 812 configured to evaluate a pre-defined criterion based on the time-related piece of information or the location-related piece of information determined by the localization circuit 708.

In various embodiments, the pre-defined criterion may be criterion based on the network control interface circuit 706 not receiving a pre-defined operation control signal. In other words, the criterion may be fulfilled in case a pre-defined operation control signal is not defined.

In various embodiments, the pre-defined criterion may be a criterion based on the combination of a plurality of pre-defined sub-criteria, wherein each sub-criterion may be a criterion based on the time-related piece of information determined by the localization circuit or based on the location-related piece of information determined by the localization circuit or based on the network control interface circuit not receiving a pre-defined operation control signal. The criterion evaluation circuit may evaluate each sub-criterion, and based on a logical operation, e.g. a plurality of conjunctions (AND-relation) or disjunction (OR-relation), the criterion may be computed. For example, in the case where only AND-relations are used to combine the sub-criteria, all sub-criteria must be met to meet the criterion, while in the case where only OR-relations are used to combine the sub-criteria, it is sufficient that at least one sub-criterion is met to meet the criterion.

In an embodiment, the execution circuit 710 may be configured to execute a pre-defined action to control the mobile radio communication protocol circuit 704 based on the evaluation result of the criterion evaluation circuit 812. In other words, depending on whether a pre-defined criterion is met or not, a pre-defined action may be executed or not. In an embodiment, when a pre-defined criterion is not met, in addition to not executing the pre-defined action that would be executed in case the criterion would have been met, another pre-defined action may be executed.

In an embodiment, the mobile radio communication device 800 may farther include a user notification circuit 814 configured to notify the users for which the mobile radio communication device 800 provides the mobile radio base station function of an action to take place if a pre-defined criterion will not be met in a future evaluation of the criterion evaluation circuit 812. As an example, the user notification circuit 814 may notify a user of the action that will take place, if the criterion will not be met in an evaluation of the criterion evaluation circuit 812 at a pre-defined time instance, e.g. 5 minutes from the notification. This may give the user the chance to change the current situation of the mobile radio communication device 800 that lead to the fact that the criterion was not met. The notification circuit 814 may further notify the user of suggested ways of achieving conditions in which the criterion will probably be met, e.g. a suggestion for changing the place of the mobile radio communication device 800.

In various embodiments, the mobile radio communication device 800 may further include a plurality of mobile radio communication protocol circuits (not shown) each configured to provide a mobile radio base station function for a mobile radio communication with another mobile radio communication device. The plurality of mobile radio communication protocol circuits, including the mobile radio communication protocol circuits 704, may provide mobile radio base station functions according to the same radio communication technology, e.g. to allow multiple base station functions using the same radio communication technology, or according to different radio communication technologies.

In various embodiments, the mobile radio communication device 800 may further be configured to be tracked by a network device such as e.g. a mobile radio communication network device or a wireless broadcast transmitter. The localization circuit 708 of the mobile radio communication device 800 may determine the location of the mobile radio communication device 800, and the mobile radio communication device 800 may communicate this determined location to a mobile radio communication network device, e.g. a mobile radio base station or a location register of the network.

In an embodiment, the mobile radio communication device 800 may further include a boundary determination circuit 816 configured to determine whether the mobile radio communication device 800 is operated within a virtual boundary imposed by the mobile network operator of the mobile radio communication device 800.

In an embodiment the result of the determination of the boundary determination circuit 816 may be used by the criterion evaluation circuit 812.

In various embodiments, the boundary determination circuit may be configured to determine whether the mobile radio communication device 800 is operated within a pre-defined geographical area made up of a macro cell cluster operated by the mobile network operator of the mobile radio communication device 800.

In an embodiment, the mobile radio communication device 800 may further include a registration circuit (not shown) configured to register with a macro cell that provides coverage to the mobile radio communication device after the mobile radio communication device is powered on.

In various embodiments, after an H(e)NB is powered on, it may scan the neighboring macro cells in a receiver mode. Then the H(e)NB may send an H(e)NB Location Registration Request message to the AHR (AP (Access Point) Home Register). The message may carry the information such as location area and cell ID of the neighboring macro cells. The AHR may register the cell ID of the neighboring macro cells as an attribute of H(e)NB profile, and may send a H(e)NB Response message to the H(e)NB.

In various embodiment, the mobile radio communication device 800 may further include an authentication circuit (not shown) configured to authenticate the mobile radio communication device 800 to the network the macro cell is connected to.

In an embodiment, the H(e)NB may send an Access Request message to the AHR. The message may carry the information such as location area and cell ID of the neighboring macro cells. The AHR may compare the information of neighboring macro cells with the saved H(e)NB profile to determine whether the H(e)NB may be operated in this specific location. If the information of neighboring macro cells does not match the H(e)NB profile, the AHR may return an H(e)NB Access Response message to refuse the H(e)NB access and may indicate "invalid location" as the cause value. If the information of neighboring macro cells matches the H(e)NB profile, the AHR may return an H(e)NB Access Response to allow the H(e)NB to operate.

This approach may desire an active connection between the MNO's core network where the AHR resides and the H(e)NB out in the field.

In this context 3GPP SA3 also discussed how security of this solution can be enhanced. If H(e)NBs are desired to report not only static information such as the cell ID as described above, but also other information that is both dynamic and difficult for an attacker to generate, security can be enhanced. One way to generate such information would be for the AHR and macro cells to share a secret key. Macro cells may then use this key to generate and transmit a keyed hash of {cell ID ∥ timestamp}. An H(e)NB claiming to be near some macro cell would then desire to provide the AHR with a recent keyed hash from that macro cell, which may then be verified by the AHR. An active connection between the MNO's core network and the H(e)NB may be desired here, too.

The active connection between the MNO's core network and H(e)NBs may be of advantage in a highly dense and complex H(e)NB framework as will be explained below. Such a framework may exist in extremely densely populated parts of a city or similar. In such a case, the active connection may feed requests and context information to a central decision making entity that derives the parameters for each of the H(e)NBs such that an overall optimum may be found, e.g. the overall network efficiency may be maximized, a minimum level of QoS may be guaranteed for each user, etc. However, it may be expensive to connect and operate such a centralized decision making entity for each deployed H(e)NB. Typically, most H(e)NBs may be not positioned in a critical high-density area. Consequently, a distributed decision making mechanism may be sufficient without any information forwarding to the backbone network. Such a distributed approach may be economically and technically viable for most of the deployed H(e)NBs.

In various embodiments, the mobile radio communication device 800 may further include a functionality activation circuit (not shown) configured to activate pre-defined functionality of the mobile radio communication device 800 based on information received from the network the macro cell is connected to. The functionality activation circuit may limit functionalities that are not allowed at the determined location of the mobile radio communication device 800, determined by the localization circuit 708.

In various embodiments, the mobile radio communication protocol circuit 704 and any other mobile radio communication protocol circuit may be configured to provide mobile radio base station function according to at least one radio communication technology of one of the following radio communication technology families:
  a Short Range radio communication technology family;
  a Metropolitan Area System radio communication technology family;
  a Cellular Wide Area radio communication technology family;
  a radio communication technology family which includes a radio communication technology in which the access to radio resources is provided in a random manner; and
  a radio communication technology family which includes a radio communication technology in which the access to radio resources is provided in a centrally controlled manner.

In various embodiments, the mobile radio communication protocol circuit 704 and any other mobile radio communication protocol circuit may be configured to provide mobile radio base station function according to at least one of the following radio communication technologies: a Bluetooth radio communication technology, an Ultra Wide Band (UWB) radio communication technology, a Wireless Local Area Network radio communication technology (e.g. according to an IEEE 802.11 (e.g. IEEE 802.11n) radio communication standard)), IrDA (Infrared Data Association), Z-Wave and ZigBee, HiperLAN/2 ((HIgh PErformance Radio LAN; an alternative ATM-like 5 GHz standardized technology), IEEE 802.11a (5 GHz), IEEE 802.11g (2.4 GHz), IEEE 802.11n, IEEE 802.11VHT (VHT=Very High Throughput), a Worldwide Interoperability for Microwave Access (WiMax) (e.g. according to an IEEE 802.16 radio communication standard, e.g. WiMax fixed or WiMax mobile), WiPro, Hiper-MAN (High Performance Radio Metropolitan Area Network), IEEE 802.16m Advanced Air Interface, a Global System for Mobile Communications (GSM) radio communication technology, a General Packet Radio Service (GPRS) radio communication technology, an Enhanced Data Rates for GSM Evolution (EDGE) radio communication technology, and/or a Third Generation Partnership Project (3GPP) radio communication technology (e.g. UMTS (Universal Mobile Telecommunications System), FOMA (Freedom of Multimedia Access), 3GPP LTE (long term Evolution), 3GPP LTE Advanced (long term Evolution Advanced)), CDMA2000 (Code division multiple access 2000), CDPD (Cellular Digital Packet Data), Mobitex, 3G (Third Generation), CSD (Circuit Switched Data), HSCSD (High-Speed Circuit-Switched Data), UMTS (3G) (Universal Mobile Telecommunications System (Third Generation)), W-CDMA (UMTS) (Wideband Code Division Multiple Access (Universal Mobile Telecommunications System)), HSPA (High Speed Packet Access), HSDPA (High-Speed Downlink Packet Access), HSUPA (High-Speed Uplink Packet Access), HSPA+ (High Speed Packet Access Plus), UMTS-TDD (Universal Mobile Telecommunications System-Time-Division Duplex), TD-CDMA (Time Division-Code Division Multiple Access), TD-CDMA (Time Division-Synchronous Code Division Multiple Access), 3GPP Rel. 8 (Pre-4G) (3rd Generation Partnership Project Release 8 (Pre-4th Generation)), UTRA (UMTS Terrestrial Radio Access), E-UTRA (Evolved UMTS Terrestrial Radio Access), LTE Advanced (4G) (long term Evolution Advanced (4th Generation)), cdmaOne (2G), CDMA2000 (3G) (Code division multiple access 2000 (Third generation)), EV-DO (Evolution-Data Optimized or Evolution-Data Only), AMPS (1G) (Advanced Mobile Phone System (1st Generation)), TACS/ETACS (Total Access Communication System/Extended Total Access Communication System), D-AMPS (2G) (Digital AMPS (2nd Generation)), PTT (Push-to-talk), MTS (Mobile Telephone System), IMTS (Improved Mobile Telephone System), AMTS (Advanced Mobile Telephone System), OLT (Norwegian for Offentlig Landmobil Telefoni, Public Land Mobile Telephony), MTD (Swedish abbreviation for Mobiltelefonisystem D, or Mobile telephony system D), Autotel/PALM Public Automated Land Mobile), ARP (Finnish for Autoradiopuhelin, "car radio phone"), NMT (Nordic Mobile Telephony), Hicap (High capacity version of NTT (Nippon Telegraph and Telephone)), CDPD (Cellular Digital Packet Data), Mobitex, DataTAC, iDEN (Integrated Digital Enhanced Network), PDC (Personal Digital Cellular), CSD (Circuit Switched Data), PHS (Personal Handy-phone System), WiDEN (Wideband Integrated Digital Enhanced Network), iBurst, and Unlicensed Mobile Access (UMA, also referred to as also referred to as 3GPP Generic Access Network, or GAN standard)).

In various embodiments, the network control interface circuit 706 may be configured to receive signals wirelessly.

In an embodiment, the network control interface circuit 706 is configured to receive signals based on the radio communication technology of the mobile radio base station function provided by the mobile radio communication protocol circuit 704.

In various embodiments, the network control interface circuit 706 may be configured to receive signals based on a radio communication technology different from the radio communication technology of the mobile radio base station function provided by the mobile radio communication protocol circuit 704.

In various embodiments, the network control interface circuit 706 may be configured to receive operation control signals embedded in at least one of U-Plane data and C-Plane data of a wireless communication system.

In various embodiments, the network control interface circuit 706 may be configured to receive operation control signals conveyed wirelessly by a neighboring mobile radio base station over (in other words: via) a cellular radio link.

In various embodiments, the network control interface circuit 706 may be configured to receive operation control signals embedded in the data stream of a wireless multicast or broadcast system.

In various embodiments, the network control interface circuit 706 may be configured to receive operation control signals conveyed wirelessly over a television or radio broadcast system.

In various embodiments, the network control interface circuit 706 may be configured to receive operation control signals including at least one of the current date and current time, encrypted and/or signed by a locally unique encryption key.

In various embodiments, the encryption key may be a locally unique encryption key of a mobile radio cell base station providing coverage for the mobile radio communication device.

In various embodiments, the encryption key may be locally unique for a certain number of mobile radio cell base stations; (e.g. neighboring) mobile radio cell base stations providing (e.g. overlapping) coverage for the mobile radio communication device.

In various embodiments, the encryption key may be a locally unique encryption key of a television signal transmitter providing coverage for the mobile radio communication device.

In various embodiments, the encryption key may be a locally unique encryption key of a radio signal transmitter providing coverage for the mobile radio communication device.

In various embodiments, the network control interface circuit 706 may be configured to receive operation control signals including common content transmitted by a plurality of mobile radio base stations spanning a virtual area defined by the mobile network operator of the mobile radio base stations.

In various embodiments, the network control interface circuit 706 may be configured to receive operation control signals including configuration parameters for configuration of the mobile radio communication device. The operation control signals may contain information to adjust any parameter of the settings of the mobile radio communication device.

In various embodiments, the network control interface circuit 706 may be configured to receive operation control signals including a first set of configuration parameters that are valid for a period of time having a first duration and a second set of configuration parameters that may be valid for a period of time having a second duration significantly shorter that the first length. The number of parameters to be transmitted may be reduced by not transmitting a full set of parameters, but transmitting e.g. only parameters that may have changed since the operation control signal was last sent.

In various embodiments, the network control interface circuit 706 may be configured to receive operation control signals including control information to trigger execution of a pre-defined action. The operation control signals may directly trigger the execution of an action, without having to refer to the localization circuit 708 or the condition evaluation circuit 812.

In various embodiments, the network control interface circuit 706 may be configured to receive operation control signals including information for an update of a pre-defined action. The received operation control signals may contain information of how a pre-defined action should be changed, or may contain information of a new pre-defined action, or may contain information about new conditions or changing existing conditions to define when to execute a pre-defined action.

In various embodiments, the localization circuit 708 may be configured to determine at least one of time-related information being the current time and location-related information of the mobile radio communication device 800 being the location of the mobile radio communication device 800. In other words: the time-related information may be the current time, and the location-related information may be the location of the mobile radio communication device 800.

In various embodiments, the localization circuit 708 may be configured to determine at least one of at least one piece of time-related information being information specifying a pre-defined action to be executed at the location where the operation control signal can be received and at least one piece of location-related information of the mobile radio communication device 800 being information specifying a pre-defined action to be executed at the time when the operation control signal can be received. In other words: the time-related information may be information specifying a pre-defined action to be executed at the location where the operation control signal can be received and the location-related information of the mobile radio communication device 800 may be information specifying a pre-defined action to be executed at the time when the operation control signal can be received.

In various embodiments, the localization circuit 708 may be configured to determine at least one of time-related information and location-related information of the mobile radio communication device based on a combination of a plurality of operation control signals received by the network control interface circuit. In other words: a plurality of operation control signals may be used to determine the time-related information or the location-related information.

In various embodiments, the localization circuit may be operated in a trusted processing environment.

In various embodiments, the localization circuit and/or the execution circuit may be operated in a trusted processing environment.

In various embodiments, the trusted processing environment may be ensured using a cryptographic service.

In various embodiments, the cryptographic service may be one of the following cryptographic services:
- an access control service;
- an identification service;
- an attestation service,
- an authentication service;
- an encryption service;
- a decryption service; and
- a digital signature service.

In various embodiments, the localization circuit and/or the execution circuit may include a Trusted Platform Module.

In various embodiments, a secure operation environment may be provided in the Home Base Station. 'Secure' in this context may mean 'trusted by the MNO'. This may be achieved by mounting either a TPM (Trusted Platform Module) or a smart card in the Home Base Station.

The Trusted Platform Module (TPM) may be an integrated circuit module that may have been developed as part of the TCG specification (TCG—Trusted Computing Group, formerly known as TCPA, Trusted Computing Platform Alliance) in order to provide a secure environment for personal computers (PCs). It may resemble a smart card inseparably mounted on a computation platform. The difference may be that it may be coupled to a system (computation platform) rather than to a user. Other deployment scenarios—apart from personal computers (PCs)—may be PDA (personal digital assistants), cellular phones, and also consumer electronics.

In various embodiments, the Home Base Stations may be equipped with a TPM. A TPM chip may be a passive element. It may be possible that it cannot actively influence neither the bootstrapping process of the system nor any ongoing operation. It may hold a unique identification tag that may be used to identify a system (computation platform) unambiguously. A TPM may generate, use and store a number of different keys (e.g., for encryption algorithms or digital signatures). These keys may not be desired to be used outside the TPM; all computations may be carried out within the trusted domain of the TPM instead. Software attacks therefore may be impossible. Also protection from hardware attacks may be good (similar to secure smart cards). TPMs may be manufactured in a way that physical attacks result inevitably in the destruction of all data. The most significant functionalities of a TPM may include the capabilities of attestation, certification, encryption/decryption, and authentication. With the attestation function a remote entity may be convinced about the support of certain functionalities by the system in question, and about the fact that the system itself is in a well-defined state. To put it another way: a computing platform with integrated TPM may proof its trustworthiness towards a remote entity. In various embodiment the operational state of a system (computation platform) successfully verified by a TPM's control function may be a precondition to execute software or to run certain applications.

In various embodiments, the execution circuit 710 may be configured to execute a pre-defined action to control the mobile radio communication protocol circuit 704 if pre-defined time-related information or pre-defined location-related information is not determined by the localization circuit 708.

In various embodiments, the execution circuit 710 may be configured to execute a pre-defined action to control the mobile radio communication protocol circuit 704 if pre-defined time-related information or pre-defined location-related information is not determined by the localization circuit 708 during a pre-defined period of time.

In various embodiments, the pre-defined action may be at least one of the following actions:
  the mobile radio communication device may notify the mobile network operator of an event that has been detected by the mobile radio communication device (Event Message);
  the mobile radio communication device may request reconfiguration from the mobile network operator of the mobile radio communication device;
  the mobile radio communication device may reduce transmission power in a pre-defined band of the mobile radio communication protocol circuit;
  the mobile radio communication device may increase transmission power in a pre-defined band of the mobile radio communication protocol circuit;
  the mobile radio communication device may change bandwidth of the mobile radio communication protocol circuit;
  the mobile radio communication device may change carrier frequency of the mobile radio communication protocol circuit;
  the mobile radio communication device may stop operating in a licensed frequency band of the mobile radio communication protocol circuit;
  the mobile radio communication device may resume operating in a licensed frequency band of the mobile radio communication protocol circuit;
  the mobile radio communication device may stop all operations; and
  the mobile radio communication device may resume all operations.

In various embodiments, the mobile radio communication protocol circuit may be further configured to continue receiving operation control signals independent from the action executed. In case functionality is restricted, e.g. in case all operations are to be stopped, all operations except the operations desired for receiving and evaluating operation control signals may be stopped. In other words: the mobile radio communication device 800 may always remain in a state (some kind of 'snooze' mode) where it can receive and evaluate operation control signals indicating to start full operation again.

In various embodiments, the pre-defined action may be restricting the functionality of at least one of the plurality of mobile radio communication protocol circuits.

In an embodiment with a plurality of mobile radio communication protocol circuits, one of the plurality of mobile radio communication protocol circuits may further be configured to continue receiving operation control signals independent from whether its functionality is restricted.

In various embodiments, the length of the duration of the effect of the pre-defined action may be increased when it is repeatedly determined that the same pre-defined action is to be executed. For example, in case operation is changed or stopped, the changed operation or stopping the operation may be maintained for a pre-defined period of time in case the action is performed for the first time. In case after the pre-defined period of time has elapsed, the action is still determined to be executed, it may be maintained for a longer period of time, e.g. twice the pre-determined time. In various embodiments, the action may be maintained for the specified time, even in the case where in the meantime instructions to stop the action are received.

In various embodiments, the intensity of the effect of the pre-defined action may be increased when it is repeatedly determined that the same pre-defined action is to be executed. Similar to enlonged periods of time for maintaining the effect of the action in case of repeatedly determining that the action should be executed, the intensity of the action may be increased. For example, in case it is determined for the first time that the action to stop all operation should be executed, only a part of the operations may be stopped, and successively, after determining that the action of stopping all operations should be executed when next evaluating which action to be executed, additional parts of operation may be stopped.

In various embodiments, a part of the pre-defined actions may be a series of instructions/measures with an increasing "level of penalty", for example as set forth in the following.

A first (optional) action (when the MNO or the Home Base Station itself finds out that a given Home Base Station is not operating correctly or is operated in the wrong location) may include sending an information package to the device, indicating that the current configuration is negatively impacting the overall network performance. Said information package may be sent over the S1 interface from the mobile radio network operator to the Home Base Station. It may further be a response to the notification of the occurrence of an event (cf. Event Message described in detail above). It may also include a (set of) one or more command(s). Alternatively, specific requests or commands for reconfiguration may follow in a subsequent message.

A second action (if no response or change of false operation/location is observed by the network operator and/or by the Home Base Station itself) may include limiting the resource assignment (e.g., reduction of bandwidth) to the concerned Home Base Station.

A third action (if no response or change of false operation/location is observed by the network operator and/or by the Home Base Station itself) may include preventing the concerned Home Base Station from operation during a fixed and limited period (e.g., shut down for 30 minutes).

An n-th action (if still no response or change of false operation/location is observed by the network operator and/or by the Home Base Station itself) may include prolonging the punishment period (e.g., shut down for (n−3)×30 minutes, with n=4, 5, 6, . . . , max).

The ultimate action (if still no response or change of false operation/location is observed by the network operator and/or by the Home Base Station itself) may include indefinitely shutting down the concerned Home Base Station.

In various embodiments, the action(s) and corresponding (e.g. pre-defined and optionally stored) parameters (such as e.g. value ranges, timer settings, step sizes for incrementing/decrementing certain parameters, etc.) may be stored in advance on the HBS and may be executed upon determining a pre-defined condition.

In various embodiments, the mobile radio communication device 800 may further include an operation control storage (not shown) configured to store allowed operation control signals.

In various embodiments, the localization circuit 708 may further be configured to compare the received operation control signals with the allowed operation control signals stored in the operation control storage.

In various embodiments, the execution circuit 710 may further be configured to execute a pre-defined action (for example utilizing pre-defined parameters) to control the mobile radio communication protocol circuit 704 if the received operation control signal is not included in the allowed operation control signals stored in the operation control storage.

In various embodiments, the execution circuit 701 may further be configured to execute a pre-defined action (for example utilizing pre-defined parameters) to control the mobile radio communication protocol circuit 704 if the received operation control signals are included in the allowed operation control signals stored in the operation control storage.

In various embodiments, the mobile radio communication device 800 may further include a location storage configured to store allowed locations.

In various embodiments, the localization circuit 708 may further be configured to determine the location of the mobile radio communication device 800 based on the operation control signals received by the network control interface circuit 706 and to compare the determined location of the mobile radio communication device 800 with the allowed locations stored in the location storage.

In various embodiments, the execution circuit 710 may further be configured to execute a pre-defined action (for example utilizing pre-defined parameters) to control the mobile radio communication protocol circuit 704 if the location determined by the localization circuit 708 is not included in the allowed locations stored in the location storage.

In various embodiments, the execution circuit 710 may further be configured to execute a pre-defined action (for example utilizing pre-defined parameters) to control the mobile radio communication protocol circuit 704 if the location determined by the localization circuit 708 is included in the allowed locations stored in the location storage.

Figure 9:
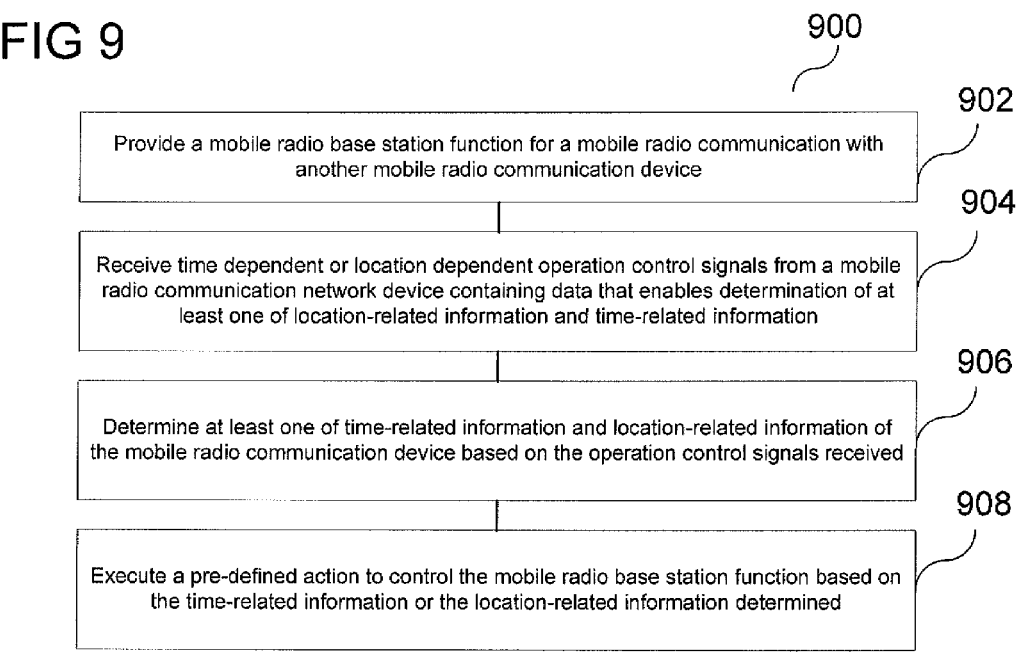
FIG. 9 shows a flow diagram illustrating a method for controlling a mobile radio communication device in accordance with an embodiment.

FIG. 9 shows flow diagram 900 illustrating a method for controlling a mobile radio communication device in accordance with an embodiment.

In 902, the mobile radio communication device may provide a mobile radio base station function for a mobile radio communication with another mobile radio communication device. It is to be noted that 902 may be executed continuously, in parallel to the following steps.

In 904, the mobile radio communication device may receive time dependent or location dependent operation control signals from a network device such as e.g. a mobile radio communication network device containing data that enables determination of at least one piece of location-related information and/or at least one piece of time-related information.

In 906, the mobile radio communication device may determine at least one piece of time-related information and/or at least one piece of location-related information of the mobile radio communication device based on the operation control signals received by the network control interface circuit.

In 906, the mobile radio communication device may execute a pre-defined action (for example utilizing pre-defined parameters) to control the mobile radio communication protocol circuit based on the time-related information or the location-related information determined by the localization circuit.

In various embodiments, the mobile radio communication device may further evaluate a pre-defined criterion based on the time-related piece of information or the location-related piece of information determined.

In various embodiments, the mobile radio communication device may further evaluate a pre-defined criterion based on the piece of time-related information or the piece of location-related information determined.

In various embodiments, the pre-defined criterion may be a criterion based on not receiving a pre-defined operation control signal.

In an embodiment, the pre-defined criterion may be a criterion based on the combination of a plurality of pre-defined sub-criteria, wherein each sub-criterion may be a criterion based on the determined piece of time-related information or based on the determined piece of location-related information or based on not receiving a pre-defined operation control signal.

In various embodiments, the mobile radio communication device may further execute a pre-defined action (for example utilizing pre-defined parameters) to control the mobile radio base station function based on the result of evaluating the pre-defined criterion.

In an embodiment, the mobile radio communication device may notify the users for which the mobile radio communication device provides the mobile radio base station function of an action to take place if a pre-defined criterion will not be met in a future evaluation of the pre-defined criterion.

In various embodiments, the mobile radio communication device may further provide a plurality of mobile radio base station functions for a mobile radio communication with another mobile radio communication device. The mobile radio communication device may provide a plurality of mobile radio base station functions according to different mobile radio communication standards or according to the same mobile radio communication standards.

In various embodiments, the mobile radio communication device may be tracked by a network device such as e.g. a mobile radio communication network device.

In various embodiments, the mobile radio communication device may determine whether it is operated within a virtual boundary imposed by its mobile network operator.

In various embodiments, the mobile radio communication device may determine whether it is operated within a pre-defined geographical area made up of a macro cell cluster operated by its mobile network operator.

In various embodiments, the mobile radio communication device may register with a macro cell that provides coverage to it after it is powered on.

In various embodiments, the mobile radio communication device may authenticate to the network the macro cell is connected to.

In various embodiments, the mobile radio communication device may activate pre-defined functionality based on information received from the network the macro cell is connected to.

In various embodiments, the mobile radio communication device may provide mobile radio base station function or mobile radio base station functions, each according to at least one radio communication technology one of the following radio communication technology families:
- a Short Range radio communication technology family;
- a Metropolitan Area System radio communication technology family;
- a Cellular Wide Area radio communication technology family;
- a radio communication technology family which includes a radio communication technology in which the access to radio resources is provided in a random manner; and
- a radio communication technology family which includes a radio communication technology in which the access to radio resources is provided in a centrally controlled manner.

In various embodiments, the mobile radio communication device may provide mobile radio base station function or mobile radio base station functions, each according to at least one of the following radio communication technologies: a Bluetooth radio communication technology, an Ultra Wide Band (UWB) radio communication technology, a Wireless Local Area Network radio communication technology (e.g. according to an IEEE 802.11 (e.g. IEEE 802.11n) radio communication standard)), IrDA (Infrared Data Association), Z-Wave and ZigBee, HiperLAN/2 ((HIgh PErformance Radio LAN; an alternative ATM-like 5 GHz standardized technology), IEEE 802.11a (5 GHz), IEEE 802.11g (2.4 GHz), IEEE 802.11n, IEEE 802.11VHT (VHT=Very High Throughput), a Worldwide Interoperability for Microwave Access (WiMax) (e.g. according to an IEEE 802.16 radio communication standard, e.g. WiMax fixed or WiMax mobile), WiPro, HiperMAN (High Performance Radio Metropolitan Area Network), IEEE 802.16m Advanced Air Interface, a Global System for Mobile Communications (GSM) radio communication technology, a General Packet Radio Service (GPRS) radio communication technology, an Enhanced Data Rates for GSM Evolution (EDGE) radio communication technology, and/or a Third Generation Partnership Project (3GPP) radio communication technology (e.g. UMTS (Universal Mobile Telecommunications System), FOMA (Freedom of Multimedia Access), 3GPP LTE (long term Evolution), 3GPP LTE Advanced (long term Evolution Advanced)), CDMA2000 (Code division multiple access 2000), CDPD (Cellular Digital Packet Data), Mobitex, 3G (Third Generation), CSD (Circuit Switched Data), HSCSD (High-Speed Circuit-Switched Data), UMTS (3G) (Universal Mobile Telecommunications System (Third Generation)), W-CDMA (UMTS) (Wideband Code Division Multiple Access (Universal Mobile Telecommunications System)), HSPA (High Speed Packet Access), HSDPA (High-Speed Downlink Packet Access), HSUPA (High-Speed Uplink Packet Access), HSPA+ (High Speed Packet Access Plus), UMTS-TDD (Universal Mobile Telecommunications System-Time-Division Duplex), TD-CDMA (Time Division-Code Division Multiple Access), TD-CDMA (Time Division-Synchronous Code Division Multiple Access), 3GPP Rel. 8 (Pre-4G) (3rd Generation Partnership Project Release 8 (Pre-4th Generation)), UTRA (UMTS Terrestrial Radio Access), E-UTRA Evolved UMTS Terrestrial Radio Access), LTE Advanced (4G) (long term Evolution Advanced (4th Generation)), cdmaOne (2G), CDMA2000 (3G) (Code division multiple access 2000 (Third generation)), EV-DO (Evolution-Data Optimized or Evolution-Data Only), AMPS (1G) (Advanced Mobile Phone System (1st Generation)), TACS/ETACS (Total Access Communication System/Extended Total Access Communication System), D-AMPS (2G) (Digital AMPS (2nd Generation)), PTT (Push-to-talk), MTS (Mobile Telephone System), IMTS (Improved Mobile Telephone System), AMTS (Advanced Mobile Telephone System), OLT (Norwegian for Offentlig Landmobil Telefoni, Public Land Mobile Telephony), MTD (Swedish abbreviation for Mobiltelefonisystem D, or Mobile telephony system D), Autotel/PALM (Public Automated Land Mobile), ARP (Finnish for Autoradiopuhelin, "car radio phone"), NMT (Nordic Mobile Telephony), Hicap (High capacity version of NTT (Nippon Telegraph and Telephone)), CDPD (Cellular Digital Packet Data), Mobitex, DataTAC, iDEN (Integrated Digital Enhanced Network), PDC (Personal Digital Cellular), CSD (Circuit Switched Data), PHS (Personal Handy-phone System), WiDEN (Wideband Integrated Digital Enhanced Network), iBurst, and Unlicensed Mobile Access (UMA, also referred to as also referred to as 3GPP Generic Access Network, or GAN standard)).

In various embodiments, the mobile radio communication device may receive signals wirelessly.

In an embodiment, the operation control signals may be received based on the radio communication technology of the mobile radio base station function.

In an embodiment, the operation control signals may be received based on a radio communication technology different from the radio communication technology of the mobile radio base station function.

In an embodiment, the operation control signals may be received embedded in at least one of U-Plane data and C-Plane data of a wireless communication system In various embodiments, operation control signals may be conveyed wirelessly by a neighboring mobile radio base station over (in other words: via) a cellular radio link.

In various embodiments, the operation control signals may be received embedded in the data stream of a wireless multicast or broadcast system.

In various embodiments, the operation control signals may be conveyed wirelessly over a television or radio broadcast system.

In an embodiment, the operation control signals may include at least one of the current date and current time, encrypted by a locally unique encryption key.

In an embodiment, the operation control signals may include at least one of the current date and current time, encrypted by a locally unique encryption key of a mobile radio cell base station providing coverage for the mobile radio communication device.

In an embodiment, the operation control signals may include at least one of the current date and current time, encrypted by a locally unique encryption key of a television signal transmitter providing coverage for the mobile radio communication device.

In an embodiment, the operation control signals may include at least one of the current date and current time, encrypted by a locally unique encryption key of a radio signal transmitter providing coverage for the mobile radio communication device.

In an embodiment, the operation control signals may include common content transmitted by a plurality of mobile radio base stations spanning a virtual area defined by the mobile network operator of the mobile radio base stations.

In an embodiment, the operation control signals may include configuration parameters for configuration of the mobile radio communication device.

In an embodiment, the operation control signals may include a first set of configuration parameters that are valid for a period of time having a first length and a second set of configuration parameters that are valid for a period of time having a second length significantly shorter that the first length.

In an embodiment, the operation control signals may include control information to trigger execution of a pre-defined action.

In an embodiment, the operation control signals may include information for an update of a pre-defined action.

In various embodiments, the mobile radio communication device may determine at least one piece of time-related information being the current time and/or at least one piece of location-related information of the mobile radio communication device being the location of the mobile radio communication device.

In various embodiments, the mobile radio communication device may determine at least one piece of location-related information being information specifying a pre-defined action to be executed at the location where the operation control signal can be received and/or at least one piece of time-related information of the mobile radio communication device being information specifying a pre-defined action to be executed at the time when the operation control signal can be received.

In various embodiments, the mobile radio communication device may determine at least one piece of time-related information and/or at least one piece of location-related information of the mobile radio communication device based on a combination of a plurality of operation control signals received.

In various embodiments, the mobile radio communication device or parts of the mobile radio communication device may be operated in a trusted processing environment.

The trusted processing environment may be ensured using a cryptographic service.

In various embodiments, the cryptographic service may be one of the following cryptographic services:
an access control service;
an identification service;
an attestation service,
an authentication service;
an encryption service;
a decryption service; and
a digital signature service.

In various embodiments, the localization circuit and/or the execution circuit may reside in (or include) a Trusted Platform Module.

In various embodiments, a pre-defined action may be executed to control the mobile radio base station function if pre-defined time-related information or pre-defined location-related information is not determined.

In various embodiments, a pre-defined action may be executed to control the mobile radio base station function if pre-defined time-related information or pre-defined location-related information is not determined during a pre-defined period of time.

In various embodiments, the pre-defined action may be at least one of the following actions:
the mobile radio communication device may notify the mobile network operator of the mobile radio communication device (e.g. by means of an Event Message);
the mobile radio communication device may request reconfiguration from the mobile network operator of the mobile radio communication device;
the mobile radio communication device may reduce transmission power in a pre-defined band of the mobile radio base station function;
the mobile radio communication device may increase transmission power in a pre-defined band of the mobile radio base station function;
the mobile radio communication device may change bandwidth of the mobile radio base station function;
the mobile radio communication device may change carrier frequency of the mobile radio base station function;
the mobile radio communication device may stop operating in a licensed frequency band of the mobile radio base station function;
the mobile radio communication device may resume operating in a licensed frequency band of the mobile radio base station function;
the mobile radio communication device may stop all operations; and
the mobile radio communication device may resume all operations.

In various embodiments, the operation control signals may continue being received independently from the action(s) executed.

In various embodiments, the pre-defined action may be restricting the functionality of at least one of the plurality of mobile radio base station functions.

In an embodiment, the mobile radio communication device may continue receiving operation control signals independent from whether its functionality is restricted.

In various embodiments, the length of the duration of the effect of the pre-defined action may be increased when it is repeatedly determined that the same pre-defined action is to be executed.

In various embodiments, the intensity of the effect of the pre-defined action may be increased when it is repeatedly determined that the same pre-defined action is to be executed.

In an embodiment, the mobile radio communication device may store allowed operation control signals.

In an embodiment, the mobile radio communication device may compare the received operation control signals with the stored allowed operation control signals.

In various embodiments, the mobile radio communication device may execute a pre-defined action (for example utilizing pre-defined parameters) to control the mobile radio base station function if the received operation control signal is not included in the stored allowed operation control signals.

In various embodiments, the mobile radio communication device may execute a pre-defined action (for example utilizing pre-defined parameters) to control the mobile radio base station function if the received operation control signal is included in the stored allowed operation control signals.

In various embodiments, the mobile radio communication device may store allowed locations.

In various embodiments, the mobile radio communication device may determine its location based on the operation control signals received and compare its determined location with the stored allowed locations.

In various embodiments, the mobile radio communication device may execute a pre-defined action (for example utilizing pre-defined parameters) to control the mobile radio communication protocol circuit if the location determined is not included in the stored allowed locations.

In various embodiments, the mobile radio communication device may execute a pre-defined action (for example utilizing pre-defined parameters) to control the mobile radio base station function if the location determined is included in the allowed locations stored.

Figure 10:
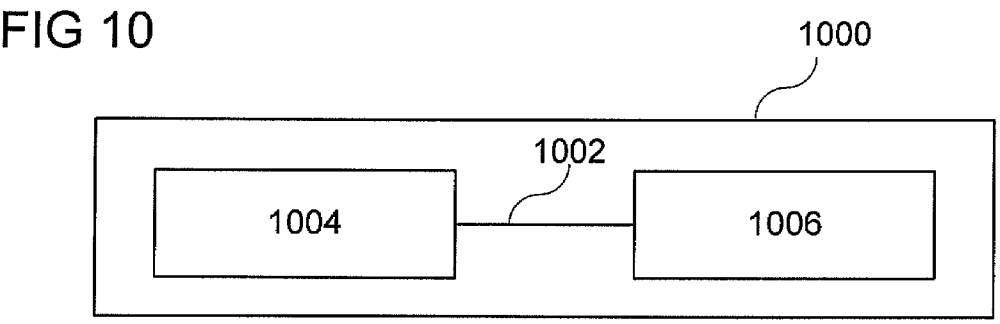
FIG. 10 shows a mobile radio communication device in accordance with an embodiment.

FIG. 10 shows a mobile radio communication device 1000 in accordance with an embodiment. The mobile radio communication device 1000 may include a mobile radio base station circuit 1004 configured to provide a mobile radio base station function for a mobile radio communication with another mobile radio communication device; and a controller 1006 configured to execute a pre-defined action to control the mobile radio base station circuit 1004, based on time-related information and/or location-related information determined from received time dependent or location dependent operation control signals.

The mobile radio base station circuit 1004 and the controller 1006 may be coupled with each other, e.g. via an electrical connection 1002 such as e.g. a cable or a computer bus or via any other suitable electrical connection to exchange electrical signals.

Figure 11:
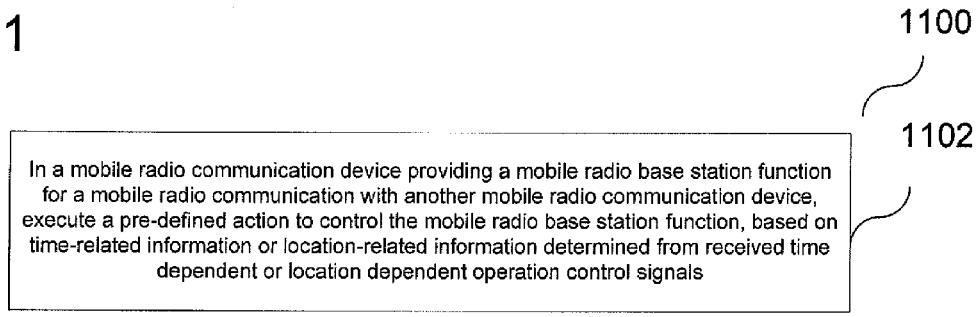
FIG. 11 shows a flow diagram illustrating a method for controlling a mobile radio communication device in accordance with an embodiment.

FIG. 11 shows flow diagram 1100 illustrating a method for controlling a mobile radio communication device in accordance with an embodiment.

In 1102, the mobile radio communication device providing a mobile radio base station function for a mobile radio communication with another mobile radio communication device, may execute a pre-defined action (for example utilizing pre-defined parameters) to control the mobile radio base station function, based on time-related information and/or location-related information determined from received time dependent and/or location dependent operation control signals.

Figure 12:
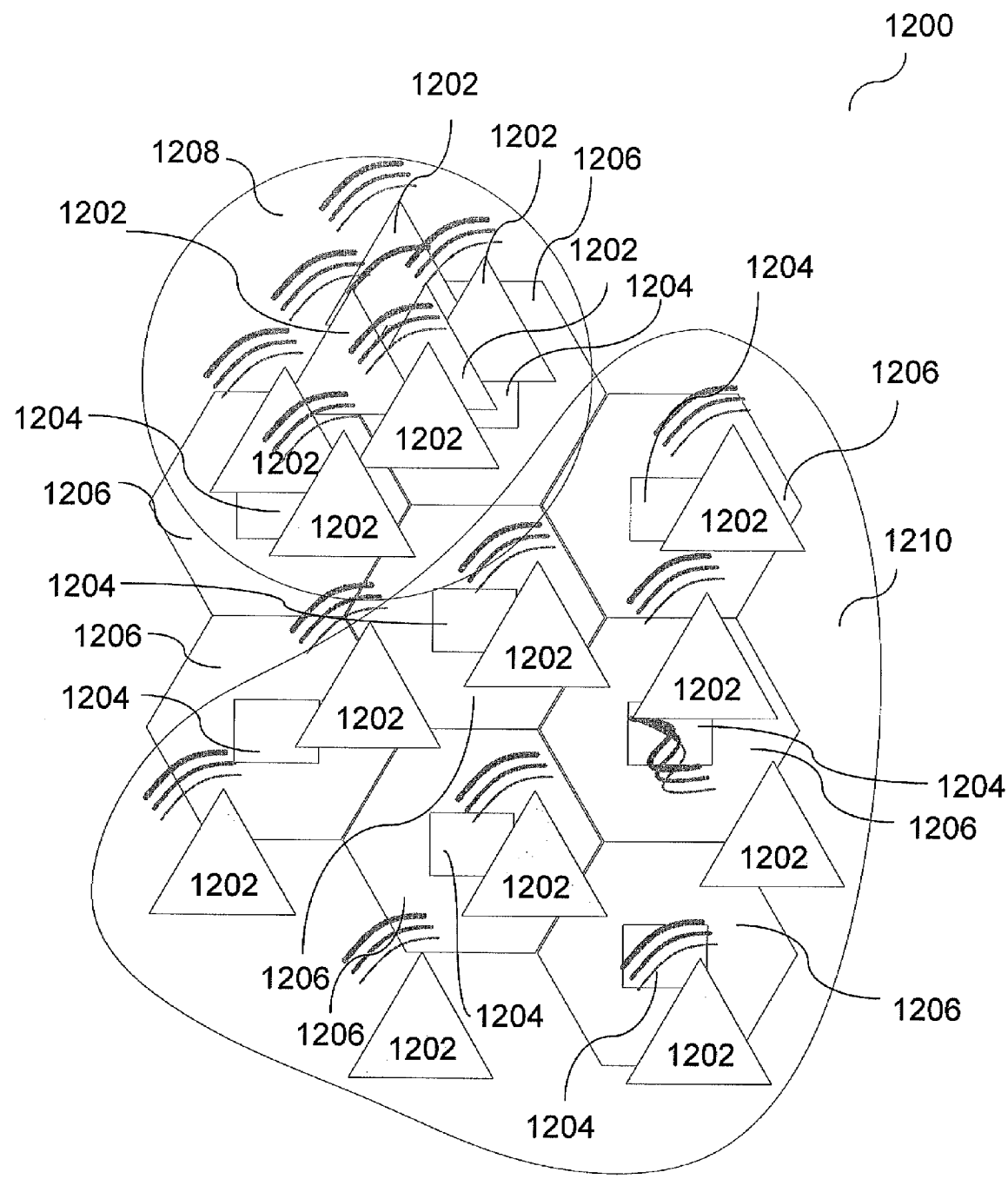
FIG. 12 shows a scenario including a plurality of mobile radio communication devices in accordance with an embodiment.

FIG. 12 shows scenario 1200 including a plurality of mobile radio communication devices 1202 in accordance with an embodiment.

In the scenario, a first region 1208 with a high density of mobile radio communication devices 1202, i.e. compared to the number of macro cells 1204, e.g. mobile radio base stations provided by a mobile network operator, e.g. a cellular system, e.g. according to 3GPP LTE, the number of mobile radio communication devices 1202 may be high. In an example scenario, each mobile radio macro cell 1204 may provide service in a coverage area 1206 for a plurality of mobile radio communication devices 1202 in the first region 1208. The mobile radio base station function of each of the mobile radio communication devices 1202 is indicated by waves illustrating the radio waves sent out from each mobile radio communication device 1202.

On the other hand, in second region 1210, in this example, there is a low density of mobile radio communication devices 1202, i.e. compared to the number of mobile radio macro cells 1204, e.g. mobile radio base stations provided by a mobile network operator, e.g. a cellular system, e.g. according to 3GPP LTE, the number of mobile radio communication devices 1202 may be not high. In an example scenario, each mobile radio macro cell 1204 may provide service in a coverage area 1206 for only a few mobile radio communication devices 1202 at the maximum in the second region 1210.

In various embodiments, a dense and complex H(e)NB deployment like in the first region 1208 may desire a backbone connection and a centralized parameterization approach for the various H(e)NBs 1202. A standard H(e)NB deployment like in the second region 1210, may not desire a centralized parameterization approach for the various H(e)NBs 1202, i.e. an approach according to an embodiment where configuration of the mobile radio communication device 1202 may be accomplished by reception and evaluation of operation control signals may be applied. In this case the evaluation of operation control signals is in various embodiments done by the H(e)NB itself, for example within a trusted execution environment residing inside the H(e)NB, so that neither a backbone connection nor a centralized control entity is needed.

Figure 13:
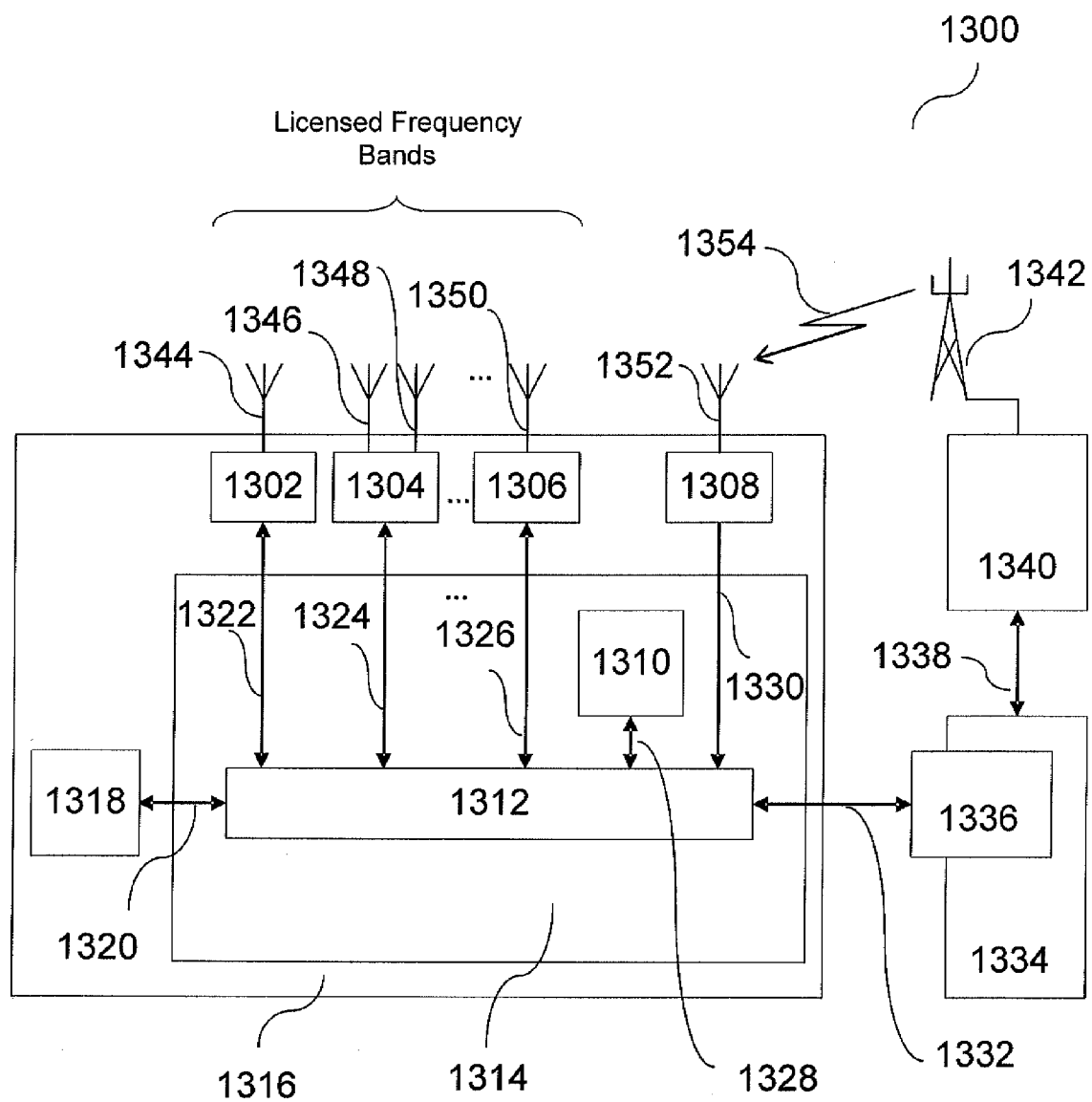
FIG. 13 shows a mobile radio communication system in accordance with an embodiment.

FIG. 13 shows a mobile radio communication system 1300 in accordance with an embodiment.

The mobile radio communication system 1300 may include a mobile radio communication device 1316 in accordance with an embodiment with a receiving circuit 1308 for receiving operation control signals 1354 from a wireless broadcast system 1340 via a wireless broadcast transmitter 1342, an execution circuit 1312, a key storage 1310, a data base 1318, and a plurality of RAT modules 1302, 1304, 1306. RAT 1304 for example may be provided with MIMO.

Operation control signals (OCS) 1354 may be transmitted via a wireless broadcast system including:
- a Receiving Circuit 1308 for receiving operation control signals 1354 over the air;
- a Key Storage 1310 (which may be provided inside a trusted execution environment 1314) where encryption keys may be stored by the key storage 1310;
- the Data Base 1318 (which may be provided outside the trusted execution environment) where predefined OCS values (for example white lists, blacklists, etc.) and instructions to be performed plus corresponding parameters (as defined by mobile network operator) may be stored; in one embodiment, these pieces of information may be encrypted by the trusted execution environment 1314 before they are stored, and decrypted after they have been retrieved, so that the Data Base 1318 (although it may be provided outside of the trusted execution environment) may become a secure place to store all kinds of data;
- the Execution Circuit 1312 (which may be provided inside the trusted execution environment 1314) for evaluating the operation control signals (OCS) 1354 received, doing encryption and decryption, and triggering at least one predefined action;
- three RAT (Radio Access Technology) modules 1302, 1304, 106, which may provide different RAT, which may be operating in accordance with at least one digital radio communication standard (for example UMTS or LTE); and
- a number of interfaces between the circuits involved:
  $R_x$ Interfaces 1322, 1324, 1326 (x=1, . . . , n) between RAT Modules 1302, 1304, 1306 and Execution Circuit 1312;
  BB (Broadband) Interface 1332 between Core Network 1334 and the Femto Cell 1316;
  Ext Interface 1330 between OCS-Receiver 1308 and Execution Circuit 1312;
  Int Interface 1328 between Execution Circuit 1312 and Key Storage 1310;
  DB Interface 1320 between Data Base 1318 and Execution Circuit 1312;
  N1 Interface 1338 between Core Network 1334 and Wireless Broadcast System 1340.

The N1 Interface 1338 may be optional.

The RAT circuits 1302, 1304 and 1306 may operate in licensed frequency bands.

The RAT circuits 1302, 1304 and 1306 each may be provided with an antenna 1344, 1346, 1348, 1350. The RAT circuit 1302 may be provided with the antenna 1344, and the RAT circuit 1306 may be provided with the antenna 1350. The RAT circuit 1304, which in one embodiment may be provided with MIMO, may be provided with a plurality of antennas, e.g. with two antennas 1346 and 1348.

The wireless broadcast system 1340 may be provided with an antenna 1342.

The mobile radio core network 1334 may communicate with the execution circuit 1312 via the BB interface 1332 and via a security gateway 1336.

In an embodiment the operation control signals (OCS) may be transmitted via the mobile radio communication system. For this embodiment, a Home Base Station may be desired to behave like a normal UE to some extent (e.g. in terms of reception capabilities) and at least one macro base stations may be desired to be in the vicinity of the Home Base Station.

In an embodiment, the OCS may be embedded either in U-plane traffic and/or in C-plane data.

In an embodiment the RRC Protocol Layer of a digital radio communication standard may be used to transport operation control signals (OCS) to the Home Base Station.

In an embodiment, the OCS-Receiver may be integrated into the corresponding RAT module (not shown in FIG. 13).

Figure 14:
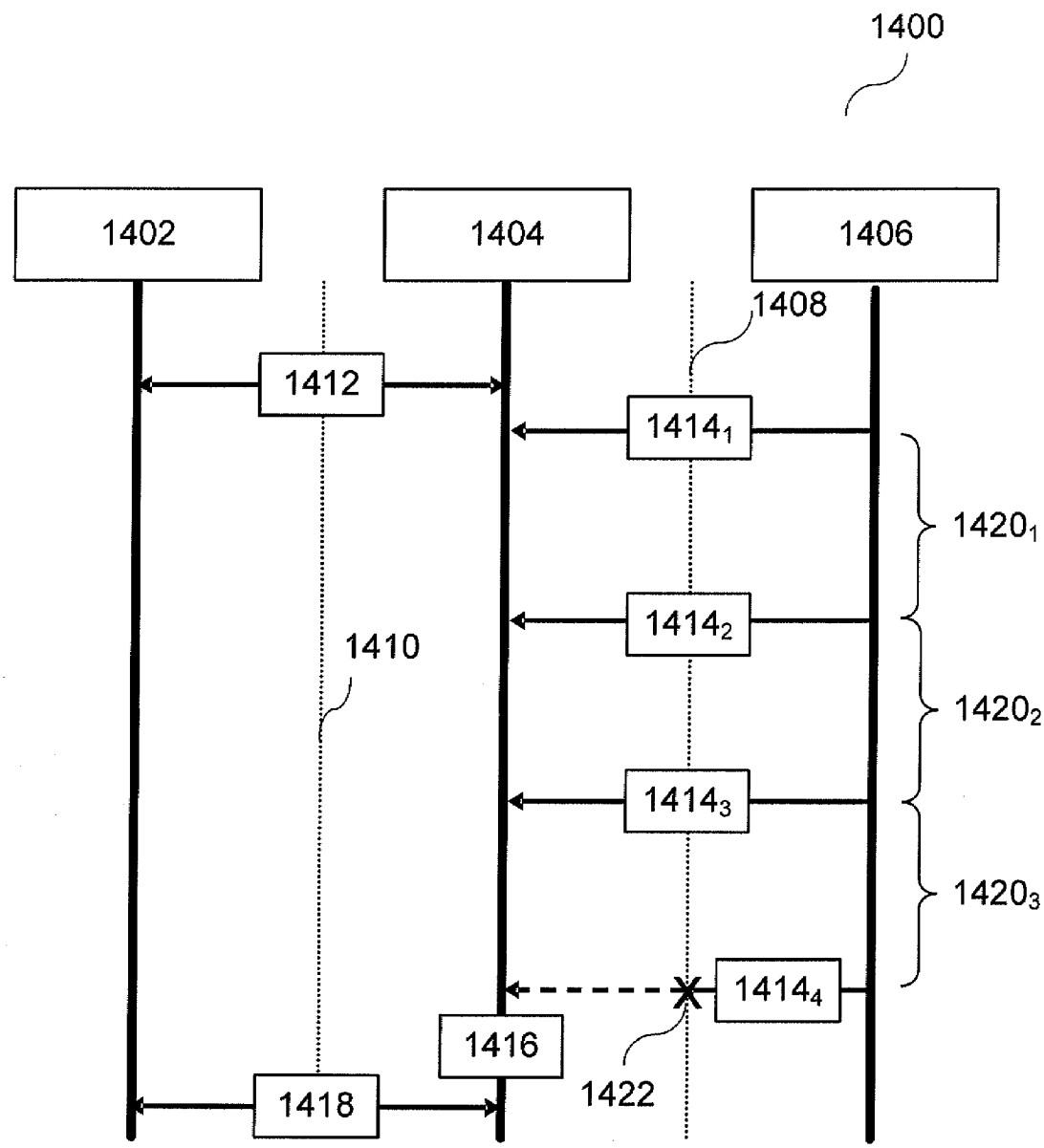
FIG. 14 shows a flow diagram illustrating a transaction flow for a Home eNodeB listening to operation control signals (OCS) from a cellular radio interface in accordance with an embodiment.

FIG. 14 shows flow diagram 1400 illustrating a transaction flow for a Home eNodeB 1404 listening to Operation Control Signals (OCS) from a Cellular Radio Interface in accordance with an embodiment.

The home base station 1404 may be connected to the mobile network operator's (MNO) core network (CN) 1402 over a broadband connection 1410, e.g. DSL.

The home base station 1404 may also have a wireless (UE-like) interface to detect downlink radio signals from neighboring base stations, such as macro cells, e.g. macro cell 1406.

The home base station may receive operation control signals from a macro cell 1406 over a cellular radio interface 1408.

The mobile radio macro cell 1406 may be configured to send operation control signals $1414_1$, $1414_2$, $1414_3$, and $1414_4$ in time intervals $1420_1$, $1420_2$, $1420_3$. The operation signals $1414_1$, $1414_2$, $1414_3$, and $1414_4$ may be different from each other or may be the same. The time intervals $1420_1$, $1420_2$, $1420_3$ may be different from each other or may be the same.

In 1412, the configuration process according to an embodiment may be executed, in which configuration commands may be exchanged between the CN 1402 and the Femto Cell 1404 including one or more of the following instructions to the Femto Cell 1404 on
  what system to listen to;
  if the system is a cellular communications system, what cell(s) to listen to;
  if the system is a wireless multicast/broadcast system, what channel(s) to listen to;
  one (or more) OCS lists (or an algorithm for calculating the list of allowed OCS messages inside the trusted execution environment plus start values), for example: white lists containing valid OCS values and/or black lists containing OCS values;
  when to try to receive OCS messages from the macro cells (transmission schedule);
  what to do in case a certain (number of) OCS message(s) cannot be received successfully;
  what to do in case a certain OCS value is (not) part of a particular list;
  cryptographic data to decrypt the OCS messages (if encryption is used); and
  cryptographic data to validate digital signatures in OCS messages (in case they are signed).

In various embodiments, these instructions may be encrypted by the Trusted Execution Environment before they are stored in the Data Base as described above.

In the example of FIG. 14, it may be assumed that the Home eNodeB (HBS) 1404 is instructed to listen only to those OCS-MC1 (operation control signals-macro cell 1) messages $1414_i$ (e.g. $1414_1$, $1414_2$, $1414_3$, $1414_4$) that are sent by Macro Cell #1 (1406) over the cellular radio interface 1408 with a periodicity of tPERIOD $1420_i$ (e.g. $1420_1$, $1420_2$, $1420_3$). It may be further assumed that the Home eNodeB (HBS) 1404 may be instructed to shut down operation in the licensed frequency bands as soon as one the OCS-MC1 messages $1414_i$ is not received or as soon as the contents of an OCS-MC1 message $1414_i$ cannot be validated. In addition, the Home eNodeB (HBS) 1404 may be instructed to inform the mobile network operator about the occurrence of such an event via the broadband link 1410. All this may be part of 1412 (configuration process).

In the example shown in FIG. 14, the OCS-MC1 messages $1414_1$, $1414_2$, and $1414_3$ may be received correctly and may be validated successfully in the trusted execution environment of the Home eNodeB (HBS) 1404. The next OCS-MC1 message $1414_4$ may not be received (for example because the Home eNodeB 1404 was moved away from the Macro Cell #1 (1406)) or was declared invalid by the Execution Circuit 1312 (for example because the time related value contained in the OCS-MC1 messages was changed to a different value according to the time dependency rules defined by the mobile network operator). These two possibilities are symbolized by the cross 1422 in FIG. 14.

In 1416 the Executor (e.g. the Execution Circuit 1312 in FIG. 13) may send out a command to the appropriate RAT Module triggering a predefined action. This may involve Data Base access and execution of some decryption algorithms. In an example the Home eNodeB (HBS) 1404 may behave according to the configuration received in 1412 and may initiate a shuts down process, i.e. it may stop operation in the licensed frequency bands, and in 1418 it may send out some feedback information about the occurrence of this event to the MNO's core network 1402.

All OCS messages may be time variant (or may contain data that allow derivation of time-related information) and location dependent (or may contain data that allow derivation of location-related information).

The Mobile Network Operator may also configure his network in a way that multiple Macro Cells spanning a larger area may send out the same OCS values.

The Mobile Network Operator may configure his network in such a way that multiple Macro Cells may send out OCS messages in which all OCS values may be changed following the same schedule. With this method the Mobile Network Operator may be given the best flexibility possible to define location dependent and time dependent operation control signals (OCS) to influence his Home Base Stations in particular areas of his network. In one embodiment the operation control signals may include a date and time value pair that may be encrypted by the Macro Cell with a cell specific (i.e. locally unique) encryption key.

In various embodiments, digital watermarking as it may be conventionally used by persons skilled in the art may be used to embed the operation control signals into the data stream from the source to the UE.

Figure 15:
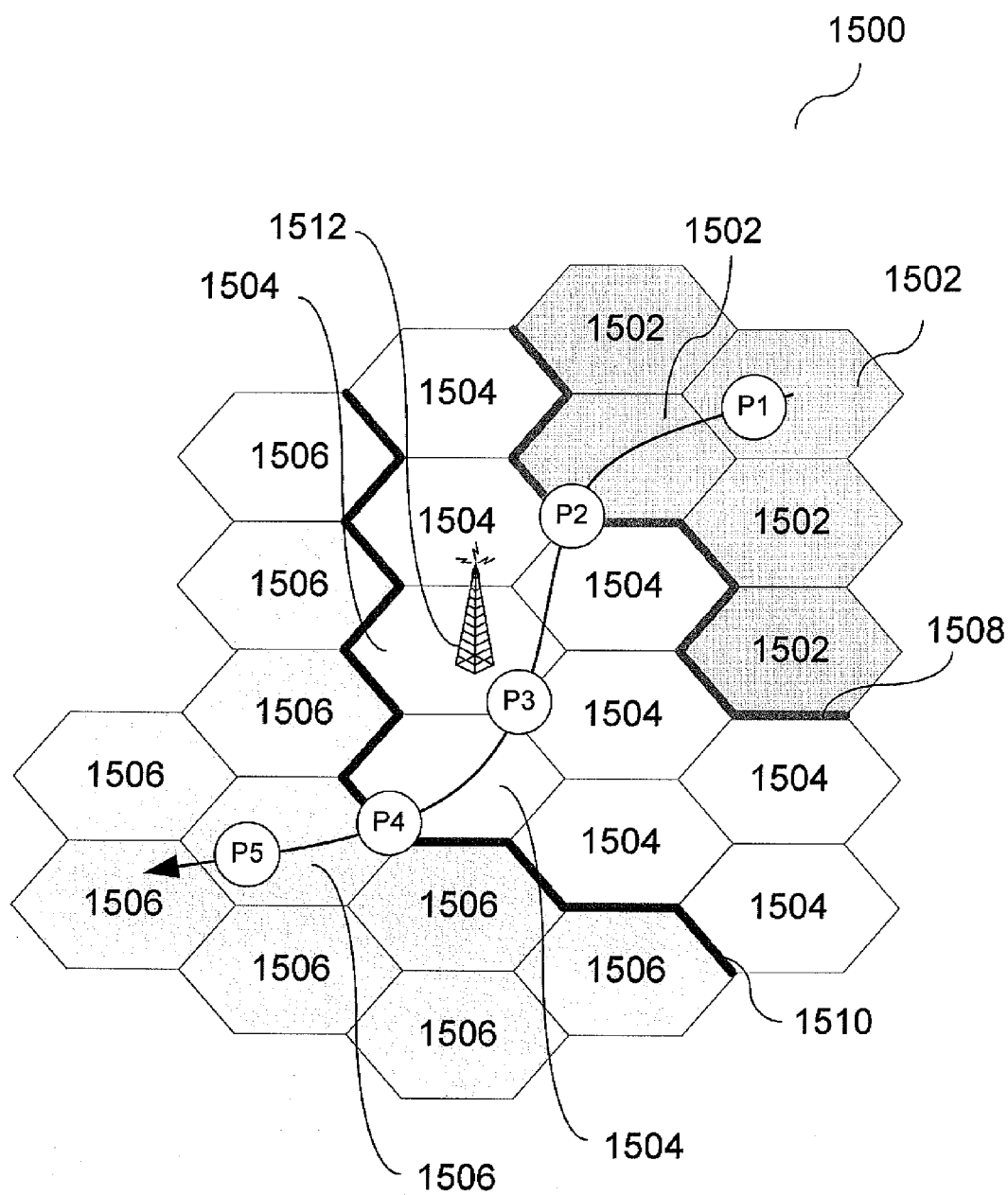
FIG. 15 shows a diagram illustrating a Home eNodeB crossing two virtual boundaries in accordance with an embodiment.

FIG. 15 shows a diagram 1500 illustrating a Home eNodeB 1512 crossing two virtual boundaries in accordance with an embodiment.

In various embodiments, operation of a Home Base Station may be controlled within boundaries imposed by the Mobile Network Operator (MNO).

In various embodiments, the Mobile Network Operator may be assumed to ensure that a given Home Base Station is not negatively impacting the overall network performance. Due to a high number of Home Base Stations and due to the fact that these may be operated by non-expert users, it may be anticipated that some of the deployed Home Base Stations may be operating in an unexpected and/or harmful way, e.g. due to false configuration, etc. Such an unplanned operational mode of a Home Base Station may finally lead to a high level of interference, low QoS (Quality of Service) perceived by users, etc. It may thus be important that the MNO may have adequate means to identify falsely operating Home Base Stations and to perform adequate actions in order to guarantee an overall satisfying operational state of the network.

FIG. 15 shows an example route of a portable Home eNodeB 1512 that is moving through three mobile radio cell clusters A, B and C as set forth in the following. Each mobile radio cell cluster may be made up of at least one macro cell.

A first mobile radio cell cluster A may be made up of the plurality of first mobile radio macro cells 1502. A second mobile radio cell cluster B may be made up of the plurality of second mobile radio macro cells 1504. A third mobile radio cell cluster C may be made up of the plurality of third mobile radio macro cells 1506.

Within the same mobile radio cell cluster all mobile radio macro cells may be sending out the same set of OCS (operation control signals). The 'journey' of the Home eNodeB 1512 may start at P1 in the first mobile radio cell cluster A, where it may receive an OCS identically transmitted by all mobile radio macro cells 1502 of the first mobile radio cell cluster A, e.g. $OCS_A$. At P2, a transition of the HeNB 1512 from the first mobile radio cell cluster A into a second cell cluster B may occur, i.e. the Home eNodeB may be leaving coverage of the first mobile radio cell cluster A and entering coverage of the second mobile radio cell cluster B. This may mean that a new set of OCS, e.g. $OCS_B$, may be received by the Home eNodeB 1512. In P3 the Home eNodeB 1512 may be within the second mobile radio cell cluster B and may only receive $OCS_B$ from the mobile radio macro cells spanning the second mobile radio cell cluster B. P4 may be indicating the next cluster transition similar to P2, i.e. the Home eNodeB may be leaving coverage of the second mobile radio cell cluster B and entering coverage of the third mobile radio cell cluster C. Consequently a new set of OCS, e.g. $OCS_C$, may be received by the Rome eNodeB 1512 instead of the $OCS_B$ set. In P5, the Home eNodeB 1512 is residing in the third mobile radio cell cluster C.

In an embodiment, the Home eNodeB 1512 may be configured to react on the changes from $OCS_A$ to $OCS_B$ in P2, and from $OCS_B$ to $OCS_C$ in P4 in the following way: In each transition point (which may correspond to a 'virtual boundary' that may be defined by the Mobile Network Operator) a punishment may be inflicted on the Home eNodeB or on the user with rising punishment level. This punishment may include various different measures, such as reduction of bandwidth, limitation of operation time, addition of a special charge on the user's bill, and combinations thereof.

In various embodiments, the MNO may have the possibility to:
  identify falsely operating Home Base Stations that are connected to his network;
  observe both usage pattern and location of these type of Home Base Stations;
  compare the observed usage patterns and locations against stored geographical boundaries for falsely operating Home Base Stations;
  communicate any observation of false operation to the corresponding Home Base Station; and/or
  limit the participation of a given Home Base Station to the overall network.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A mobile radio communication device, comprising:
  a mobile radio communication protocol circuit configured to provide a mobile radio base station function for a mobile radio communication with at least one other mobile radio communication device according to at least one radio communication technology;
  a network control interface circuit configured to receive time dependent or location dependent operation control signals from a network device containing data that enables determination of at least one of a piece of location-related information and a piece of time-related information, wherein the time dependent or location dependent control signals comprise information for configuring a mobile radio communication protocol circuit for mobile radio communication with the at least one other mobile radio communication device;
  a localization circuit configured to determine at least one of a piece of time-related information and a piece of location-related information of the mobile radio communication device based on the operation control signals received by the network control interface circuit; and
  an execution circuit configured to execute a pre-defined action to control the mobile radio communication protocol circuit based on the at least one of the piece of time-related information and the piece of location-related information determined by the localization circuit, wherein the pre-defined action is selected from a group of actions consisting of:
    the mobile radio communication device reducing transmission power in a pre-defined band of the mobile radio communication protocol circuit while remaining within the at least one radio communication technology;
    the mobile radio communication device increasing transmission power in a pre-defined band of the mobile radio communication protocol circuit while remaining within the at least one radio communication technology;
    the mobile radio communication device changing bandwidth of the mobile radio communication protocol circuit remaining within keeping the at least one radio communication technology;
    the mobile radio communication device changing carrier frequency of the mobile radio communication protocol circuit remaining within keeping the at least one radio communication technology;

the mobile radio communication device stopping operating in a licensed frequency band of the mobile radio communication protocol circuit;

the mobile radio communication device resuming operating in a licensed frequency band of the mobile radio communication protocol circuit;

the mobile radio communication device stopping all operations; and the mobile radio communication device resuming all operations.

2. The mobile radio communication device of claim 1, further comprising:

a criterion evaluation circuit configured to evaluate a pre-defined criterion based on the time-related information or the location-related information determined by the localization circuit.

3. The mobile radio communication device of claim 2, wherein the execution circuit is configured to execute a pre-defined action to control the mobile radio communication protocol circuit based on the evaluation result of the criterion evaluation circuit.

4. The mobile radio communication device of claim 2, further comprising:

a user notification circuit configured to notify the users for which the mobile radio communication device provides the mobile radio base station function of an action to take place if a pre-defined criterion will not be met in a future evaluation of the criterion evaluation circuit.

5. The mobile radio communication device of claim 1, further comprising:

a boundary determination circuit configured to determine whether the mobile radio communication device is operated within a virtual boundary imposed by the mobile network operator of the mobile radio communication device.

6. The mobile radio communication device of claim 1, wherein the mobile radio communication protocol circuit is further configured to provide a mobile radio base station function according to at least one radio communication technology of a radio communication technology family selected from a group of radio communication technology families consisting of a Short Range radio communication technology family;

a Metropolitan Area System radio communication technology family;

a Cellular Wide Area radio communication technology family;

a radio communication technology family which includes a radio communication technology in which the access to radio resources is provided in a random manner; and a radio communication technology family which includes a radio communication technology in which the access to radio resources is provided in a centrally controlled manner.

7. The mobile radio communication device of claim 1, wherein the network control interface circuit is further configured to receive signals based on the radio communication technology of the mobile radio base station function.

8. The mobile radio communication device of claim 1, wherein the network control interface circuit is further configured to receive operation control signals of at least one of user plane data and control plane data of a wireless communication system.

9. The mobile radio communication device of claim 1, wherein the network control interface circuit is further configured to receive operation control signals by a neighboring mobile radio base station via a cellular radio link.

10. The mobile radio communication device of claim 1, wherein the network control interface circuit is further configured to receive operation control signals of a data stream of at least one of a wireless multicast system and a wireless broadcast system.

11. The mobile radio communication device of claim 1, wherein the mobile radio communication protocol circuit is further configured to continue receiving operation control signals independent from the action executed.

12. A method for controlling a mobile radio communication device, comprising:

providing a mobile radio base station function for a mobile radio communication with at least one other mobile radio communication device according to at least one radio communication technology;

receiving time dependent or location dependent operation control signals from a network device containing data that enables determination of at least one of location-related information and time-related information, wherein the time dependent or location dependent control signals comprise information for configuring a mobile radio communication protocol circuit for mobile radio communication with the at least one other mobile radio communication device;

determining at least one of a piece of time-related information and a piece of location-related information of the mobile radio communication device based on the operation control signals received; and executing a pre-defined action to control the radio base station function based on the at least one of the piece of time-related information and the piece of location-related information determined, wherein the pre-defined action is selected from a group of actions consisting of:

the mobile radio communication device reducing transmission power in a pre-defined band of the mobile radio base station function while remaining within the at least one radio communication technology;

the mobile radio communication device increasing transmission power in a pre-defined band of the mobile radio base station function while remaining within the at least one radio communication technology;

the mobile radio communication device changing bandwidth of the mobile radio base station function while remaining within the at least one radio communication technology;

the mobile radio communication device changing carrier frequency of the mobile radio base station function while remaining within the at least one radio communication technology;

the mobile radio communication device stopping operating in a licensed frequency band of the mobile radio base station function;

the mobile radio communication device resuming operating in a licensed frequency band of the mobile radio base station function;

the mobile radio communication device stopping all operations; and the mobile radio communication device resuming all operations.

13. The method of claim 12, further comprising:

evaluating a pre-defined criterion based on the at least one of the piece of time-related information and the piece of location-related information determined.
14. The method of claim 13, further comprising:
executing a pre-defined action to control the radio base station function based on the result of evaluating the pre-defined criterion.
15. The method of claim 13, further comprising:
notifying the users for which the mobile radio communication device provides the mobile radio base station function of an action to take place if a pre-defined criterion will not be met in a future evaluation of the pre-defined criterion.
16. The method of claim 12, further comprising:
determining whether the mobile radio communication device is operated within a virtual boundary imposed by the mobile network operator of the mobile radio communication device.
17. The method of claim 12,
wherein the mobile radio base station function is provided according to at least one radio communication technology of a radio communication technology family selected from a group of radio communication technology families consisting of:
a Short Range radio communication technology family;
a Metropolitan Area System radio communication technology family;
a Cellular Wide Area radio communication technology family;
a radio communication technology family which includes a radio communication technology in which the access to radio resources is provided in a random manner; and
a radio communication technology family which includes a radio communication technology in which the access to radio resources is provided in a centrally controlled manner.
18. The method of claim 12,
wherein the operation control signals are received based on the radio communication technology of the mobile radio base station function.
19. The method of claim 12,
wherein the operation control signals are received of at least one of user plane data and control plane data of a wireless communication system.
20. The method of claim 12,
wherein the operation control signals are received in a data stream of at least one of a wireless multicast system and a wireless broadcast system.
21. The method of claim 12,
wherein operation control signals are continuously received independent from the executed action.

* * * * *